US009310517B2

(12) United States Patent
Kirby

(10) Patent No.: US 9,310,517 B2
(45) Date of Patent: Apr. 12, 2016

(54) METHOD AND SYSTEM FOR DETERMINING ACCURACY OF A WEATHER PREDICTION MODEL

(75) Inventor: Stephen F. Kirby, Las Cruces, NM (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 1192 days.

(21) Appl. No.: 13/290,662

(22) Filed: Nov. 7, 2011

(65) Prior Publication Data

US 2013/0117608 A1 May 9, 2013

(51) Int. Cl.
*G06F 7/60* (2006.01)
*G06F 17/10* (2006.01)
*G01W 1/10* (2006.01)

(52) U.S. Cl.
CPC ........................................ *G01W 1/10* (2013.01)

(58) Field of Classification Search
CPC ......... G06F 17/50; G06F 17/40; G06F 17/60; G06F 19/00; G01W 1/10
USPC ............................................................ 703/2
See application file for complete search history.

(56) References Cited

U.S. PATENT DOCUMENTS

| 6,535,817 | B1 | 3/2003 | Krishnamurti | |
|---|---|---|---|---|
| 7,107,152 | B2 | 9/2006 | Fixman | |
| 2004/0210391 | A1* | 10/2004 | Kolodner et al. | 702/3 |
| 2004/0215483 | A1* | 10/2004 | Fixman | 705/1 |
| 2006/0271297 | A1* | 11/2006 | Repelli et al. | 702/3 |
| 2007/0244644 | A1* | 10/2007 | Tanahashi | 702/3 |

OTHER PUBLICATIONS

"A JSP-Based Web Tool for Meteorological Model Execution and Evaluation", Stephen Kirby, US Army Research Laboratory, Computational and Information Sciences Directorate, Battlefield Environment Division, White Sands Missile Range, NM USA, pp. 465-470, Jun. 24, 2002.

"Exploiting the Internet to Automate the Execution of Mesoscale Models", Stephen F. Kirby, Young Yee, Patrick Haines, Teizi Henmi, US Army Research Lab, White Sands Missile Range, NM, B.A. Malloy, Clemson Unicersity, Clemson, SC, 5 pages, Jan. 18, 2001.

(Continued)

*Primary Examiner* — Aniss Chad
(74) *Attorney, Agent, or Firm* — Lawrence E. Anderson

(57) ABSTRACT

A method and system for determining the accuracy of a mesoscale weather model comprising at least one processor having at least one input for inputting a preexisting weather model and initial weather data comprising surface level and upper air temperatures and wind conditions, and actually measured surface level and the upper-air level weather conditions; the at least one processor operating to use the mesoscale weather model to generate output data comprising forecasted temperatures, wind conditions, and predicted weather conditions; the at least one processor operating to compare the output data to actually measured data obtained when same or similar initial weather data were present and subsequent resulting temperatures, wind conditions and weather conditions were measured; and the at least one processor operating to generate an accuracy rating reflecting the deviation of temperature, wind conditions and weather conditions predicted by the mesoscale weather model as compared to those actually measured.

20 Claims, 23 Drawing Sheets

(56) References Cited

OTHER PUBLICATIONS

"Mesoscale Model Date Preparation and Execution: A New Method Utilizing the Internet" Stephen F. Kirby, Army Research Laboratory, Computational and Information Sciences Directorate Battlefield Environment Division, ARL-TR-2687, 37 pages, Nov. 2002.

"Model Execution and Evaluation Tool: Current Status and Initial MM5 Ensemble Member Analysis Results" Stephen F. Kirby, Army Research Laboratory, Computational and Information Sciences Directorate Battlefield Environment Division, ARL-TR-577, 38 pages, Dec. 2003.

"Weather Model Characteristic Determination via Java Web Services Composition", Stephen F. Kirby, pp. 664-688, Jun. 21, 2004.

"Web-Based Mesoscal Model Computing", Stephen Kirby, Y. Yee, T. Henmi, and P. Haines, US Army Research Laboratory, Computational and Information Sciences Directorate, Battlefield Environment Division; White Sands Missile Range, NM, pp. 684-688, Jun. 25, 2001.

"Model Evaluation Tools Version 1.0 (METv1.0)", User's Guide, Developmental Testbed Center, Research Applications Laboratory, National Center for Atmospheric Research, Boulder, CO, 136 pages, Jan. 2008.

"A Description of the Advanced Research WRF Version 3" William C. Skamarock, et al., NCAR/TN-475+STR, NCAR Technical Note, Mesoscale and Microscale Meteorology Division, National Center for Atmospheric Research, Jun. 2008, 125 pages, downloaded from website: http://www.mmm.ucar.edu/wrf/users/docs/arw_v3.pdf.

"User's Guide for the NMM Core of the Weather Research and Forecast (WRF) Modeling System Version 3", 195 pages, no date, developed by the National Oceanic and Atmospheric Administration (NOAA) National Centers for Environmental Prediction (NCEP) WRF v3.3.1 Release Sep. 23, 2011 downloaded from website: http://www.dtcenter.org/wrf-nmm/users/docs/user_guide/V3/users_guide_nmm_chap1-7.pdf.

"The Advanced Regional Prediction System (ARPS)—A multi-scale nonhydrostatic atmospheric simulation and prediction model. Part I: Model dynamics and verification", M. Xue, et al., 33 pages, Revised Jul. 17, 2000, downloaded from website: http://wwwcaps.ou.edu/papers/ARPSPartI_MAP2000.pdf.

"NCAR Command Language Reference Manual". NCAR Command Language, Release for software, Downloaded from website: http://www.ncl.ucar.edu/Document/Manuals/Ref_Manual/, downloaded Oct. 31, 2011.

"The Atmospheric Model Evaluation Tool (AMET): Meteorology Module", Robert Gilliam, Wyat Appel, and Sharon Phillips, Atomspheric Sciences Modeling Division, National Oceanic and Atmospheric Administration, Air Resources Laboratory, on assignment to the Environmental Protection Agency's National Exposure Research Lab, Office of Air Quality Palnning and Standards, U.S. EPA, Research Triangle Park, SC., 18 pages.

"The Model Evaluation Tools (MET): Community Tools for Forecast Evaluation" Tressa L. Fowler, John Halley Gotway, Barbara Brown, Randy Bullock, Paul Oldenburg, Anne Holmes, Eric Gilleland, and Tara Jensen, Jul. 2011, 19 pages.

"Statistical Methods in the Atmospheric Sciences", Daniel S. Wilks, Academic Press, 1995, p. 251 and pp. 275-276.

"Java Server Faces", David Geary, Cay Horstmann, Sun Microsystems Press, p. 126 and 279-283.

"Professional JSP 2nd Edition", Simon Brown, et al., publication date Apr. 2001, pp. 467-473.

"Web Services Glossary" downloaded from website: http://dev.w3.org/cvsweb/~checkout~/2002/ws/arch/glossary/wsa-glossary.html 20 pages.

"Web Services.xml", downloaded from website: http://webservices.xml.com/pub/a/ws/2002/02/12/webservicefaqs.html 3 pages.

"Web Service", downloaded from website: http://en.wikipedia.org/wiki/Web_services 5 pages.

"Mesoscale Meterology" downloaded from website: http://en.wikipedia.org/wiki/Mesoscale_meteorology 2 pages.

"Creating Web Services with Apache Axis", Dion Almaer, May 22, 2002, downloaded from website: http://www.onjava.com/pub/a/onjava/2002/06/05/axis.html 3 pages.

"Creating a Web Service Using Apache Axis2" Laura Zavala, downloaded from website: http://www.cse.sc.edu/~zavalagu/axis2/guide.html 21 pages.

"Step by Step Tutorial of Web Service With Axis2 and Tomcat in Java—Part 2", Mar. 26, 2007, downloaded from website: http://sacrosanctblood.blogspot.com/2007/03/step-by-step-tutorial-of-web-service.html 10 pages.

"AMET—Atmospheric Model Evaluation Tool (AMET)", K. Wyatt Appel and Robert C. Gilliam, Oct. 8, 2008, downloaded from website: http://www.cmascenter.org 23 pages.

"Experience with Forecasting Univariate Time Series and the Combination of Forecasts", P. Newbold and C. W. Granger, Journal Royal Statistical Society A, (1974), 137, Part 2, p. 131.

"Microscale Meterology" downloaded from website: http://en.wikipedia.org/wiki/Microscale_meteorology 1 page.

"Challenges with the Real-Time Mesoscale Analysis System (RTMA)", Geoffrey S. Manikin and M. Pondeca, "Nowcast" section, Bulletin of the American Meteorological Society, vol. 90, No. 9, Sep. 2009, pp. 1273-1275.

"Model Tool Kit_An Automated (web-based and web services) means to execute & evaluate mesoscale weather models", Stephen Kirby, Feb. 22, 2010, US Army Research Laboratory CISD BED, 71 pages.

Gilliam, Robert, et al. "The Atmospheric Model Evaluation Tool (AMET): Meteorology Module" published at www.cmascenter.org/conference/2005/abstracts/6_1.pdf, pp. 1-6.

* cited by examiner

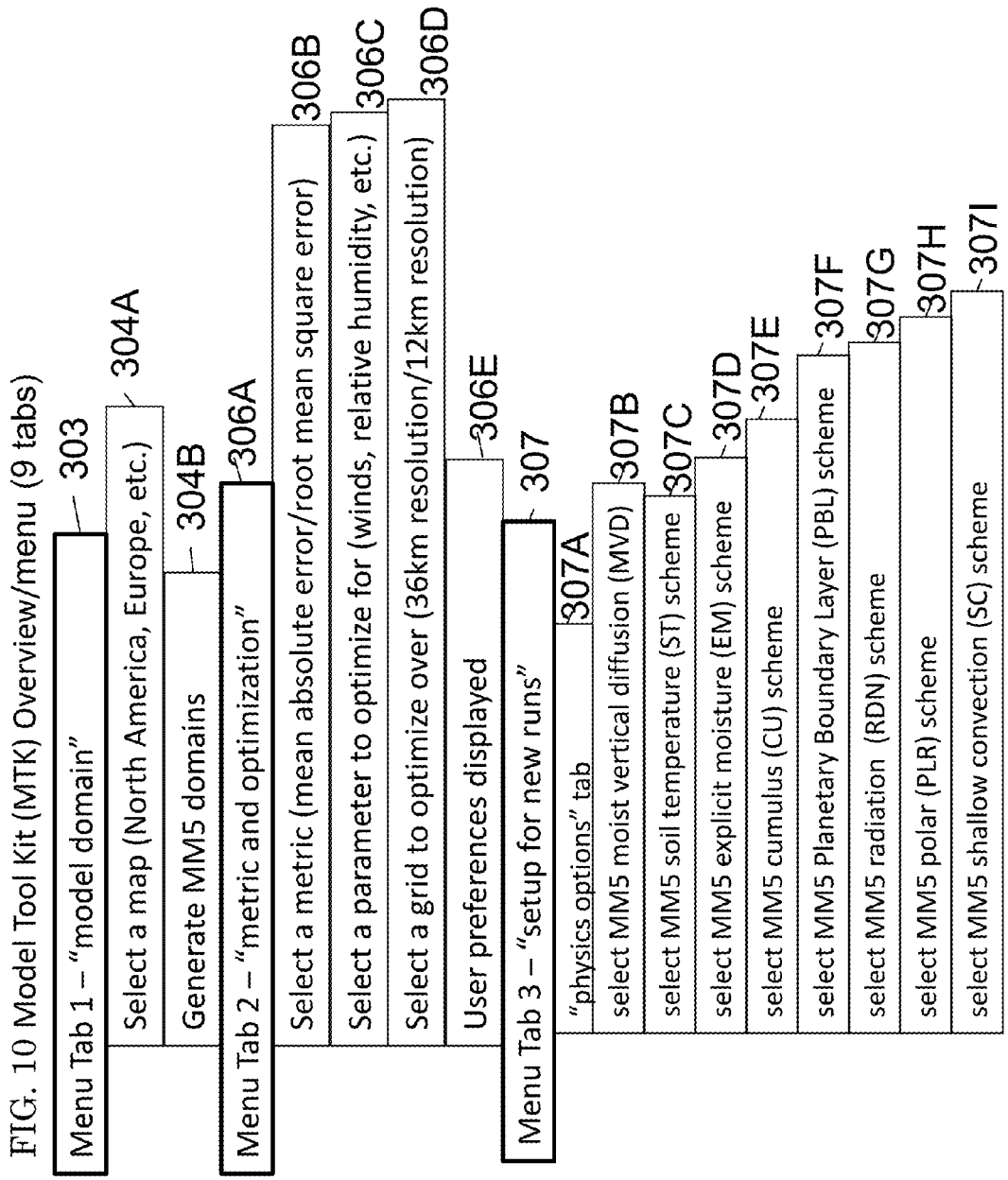
FIG. 10 Model Tool Kit (MTK) Overview/menu (9 tabs)

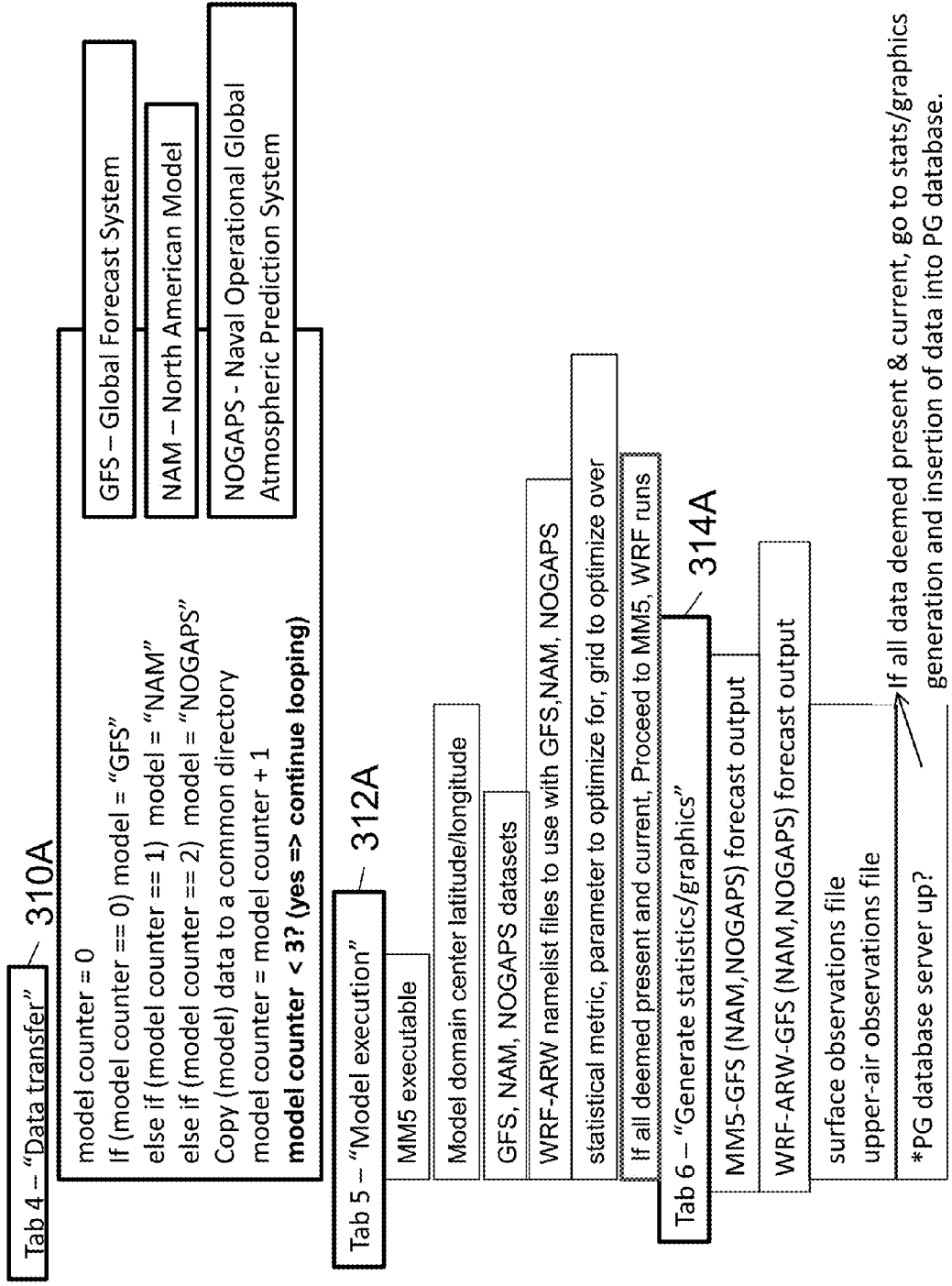
FIG. 11 Model Tool Kit (MTK) Overview/menu (9 tabs) Continued

FIG. 12 Model Tool Kit (MTK) Overview/menu (9 tabs) Continued

Tab 6 – "Generate statistics/graphics" Continued — 314A

- Interpolate MM5, WRF-ARW model output to surface report locations — 314B
- Interpolate MM5, WRF-ARW model output to sounding locations — 314C
- Generate surface, upper-air stats (bias, rmse) for MM5, WRF-ARW — 314D
- Insert MM5, WRF-ARW surface, upper-air stats of temperature, rh, u-, v-components of the wind into database — 314E
- Insert MM5, WRF-ARW bias plots, scatterplots of temperature, rh, u-, v-components of the wind into database — 314F
- Display a message to the user that they can now proceed to the "Determine Best Model" tab or can view plots from the "Stats/Graphics → access" tab — 314G Tab 7 – "Determine best model" — 316A

- "parameter to optimize for" value (ex. temperature) — 316B
- "metric" value (statistical measure, ex., mean absolute error) — 316C
- "grid" value (ex. 36km horizontal resolution) — 316D
- mm5,wrf-arw surface statistical files — 316E
- mm5,wrf-arw upper-air statistical files — 316F
- If all data deemed current, "Find Best Model" button will display — 316G

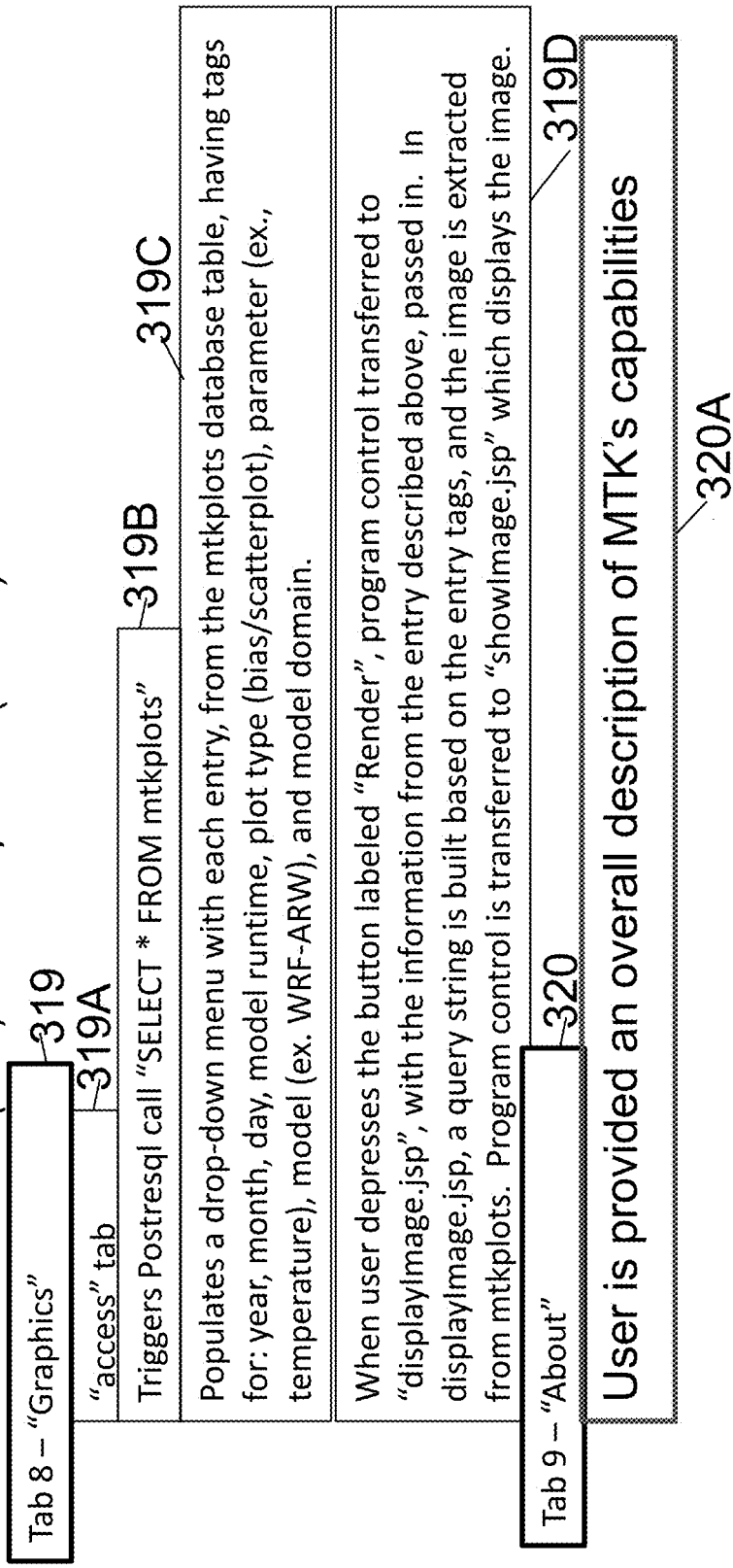
FIG. 13 Model Tool Kit (MTK) Overview/menu (9 tabs) Continued

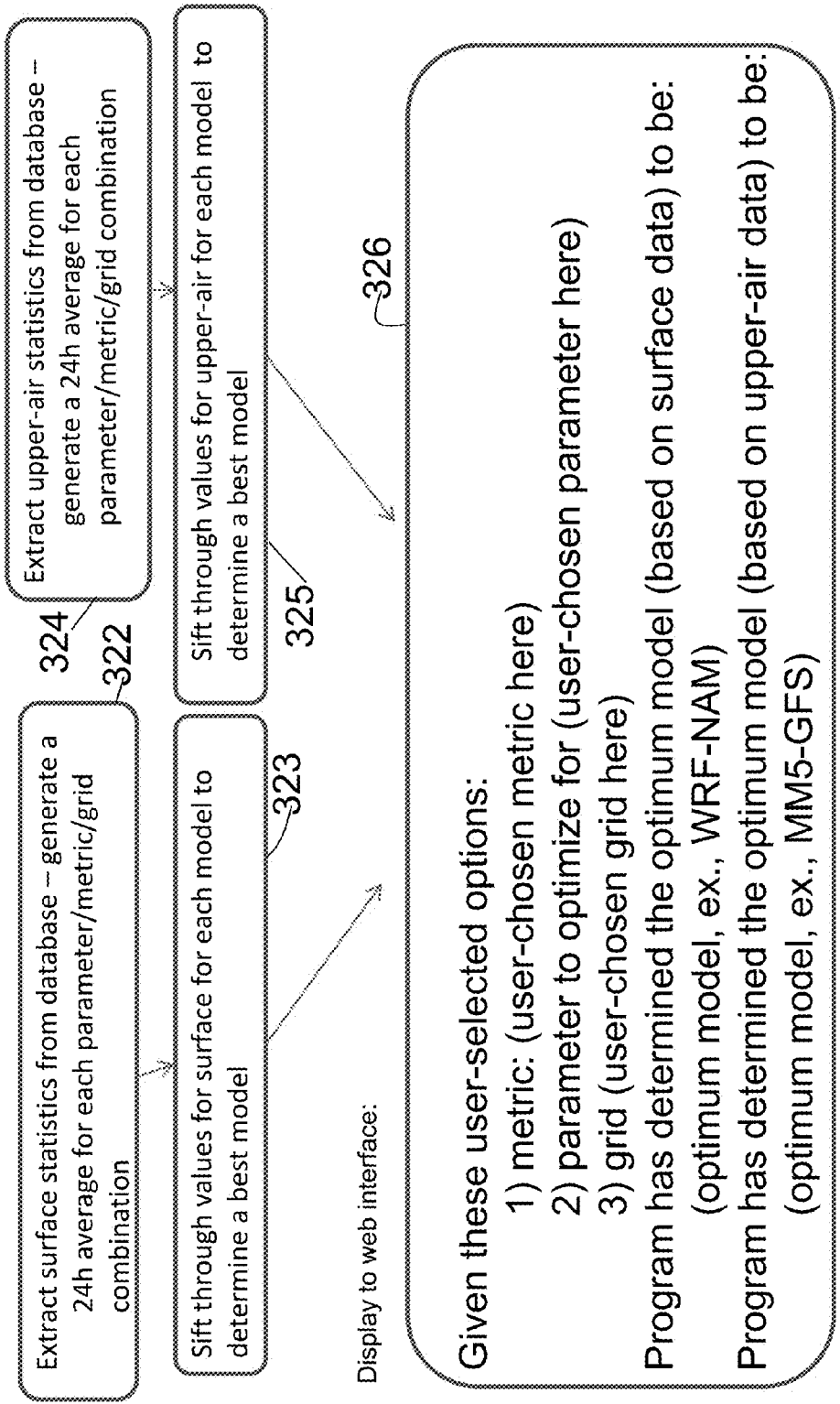
FIG. 14 "Determine Best Model" SURFACE & UPPER-AIR DATA INPUTS

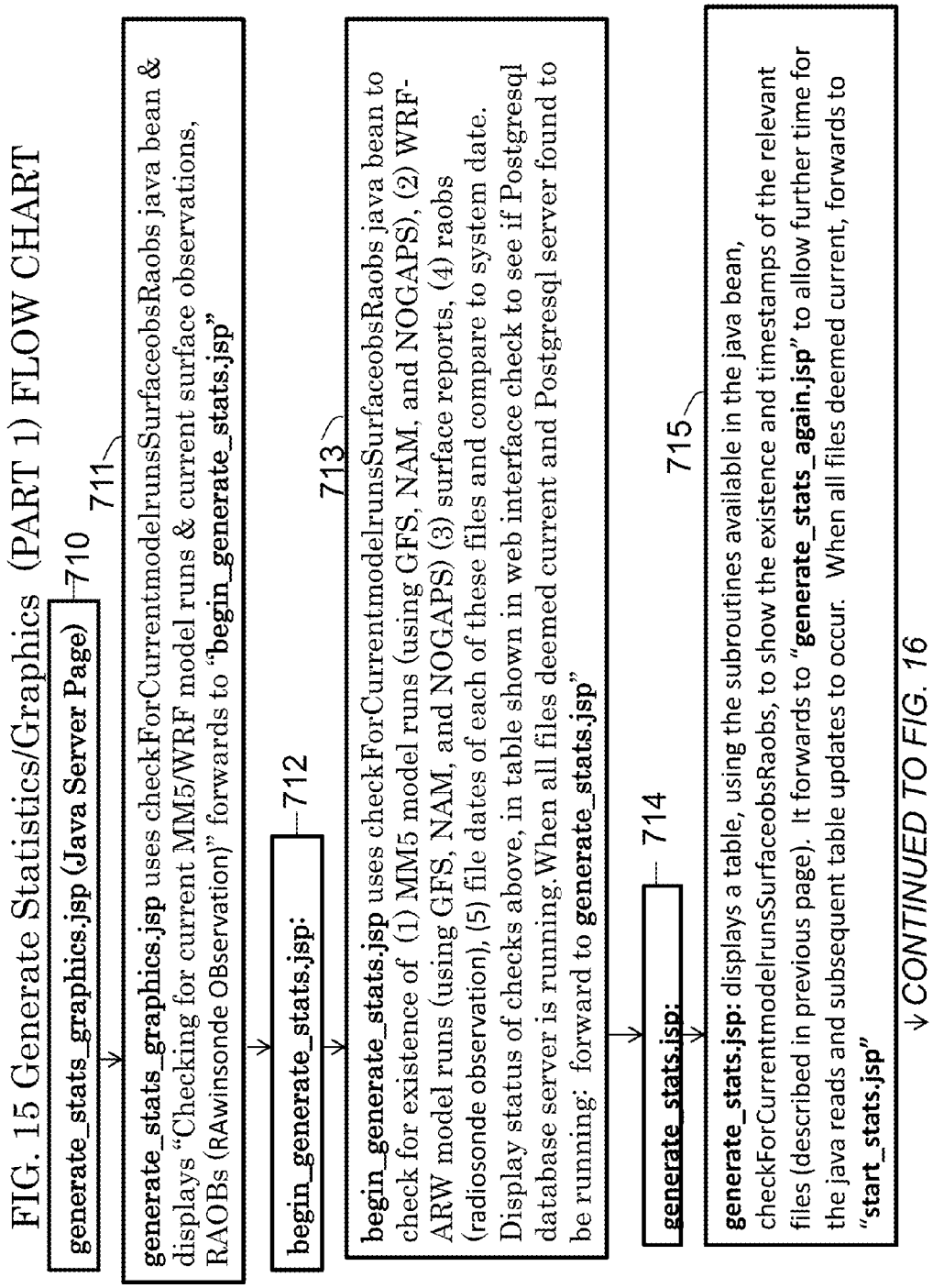
FIG. 15 Generate Statistics/Graphics (PART 1) FLOW CHART

FIG. 16 Generate Statistics/Graphics (PART 2) FLOW CHART
(CONTINUED FROM FIG. 15)

716 — start_stats.jsp is similar to generate_stats.jsp and generate_stats_again.jsp except when the surface reports, raob data, MM5 forecast output, WRF-ARW output are all deemed current and the Postgresql server is deemed to be up, start_stats.jsp leads to the display of the button labeled: "Go to Statistics"

717 — Go to Statistics" button leads to MET_UI_Bean.gotostatistics, i.e., the gotostatistics subroutine in MET_UI_Bean.java; returns the string "gotostatistics." Specifically, faces-config.xml dictates that when start_stats.jsp returns the string "gotostatistics," program control transfers to start_statistics_and_graphics_generation_dbinsert.jsp"

718 — Statistical generation of "truth" data:
(1) the surface "truth" data set comprises "mesonet" and "METAR" reports pulled from the "Meteorological Assimilation Data Ingest System" (MADIS) FTP site at 2100 MST daily. Datasets for hours 0000-2300 MST are gathered. Data sets are in netCDF format with each hourly block of data composed of many parameters.

719 — 'ncdump' function is used to break out an hourly block of data into files each representing a particular parameter at a particular hour.

720 — (A) looping over the hours (00-23){ (B) looping over the types (mesonet, metar){
(C) looping over the parameters (wd, ws, t2, dewpoint, rh, lat, lon, rh, terrain){
(D) call C code reads off the "data" portion of the ncdumped file into a new file.

↓ *CONTINUED TO FIG. 17*

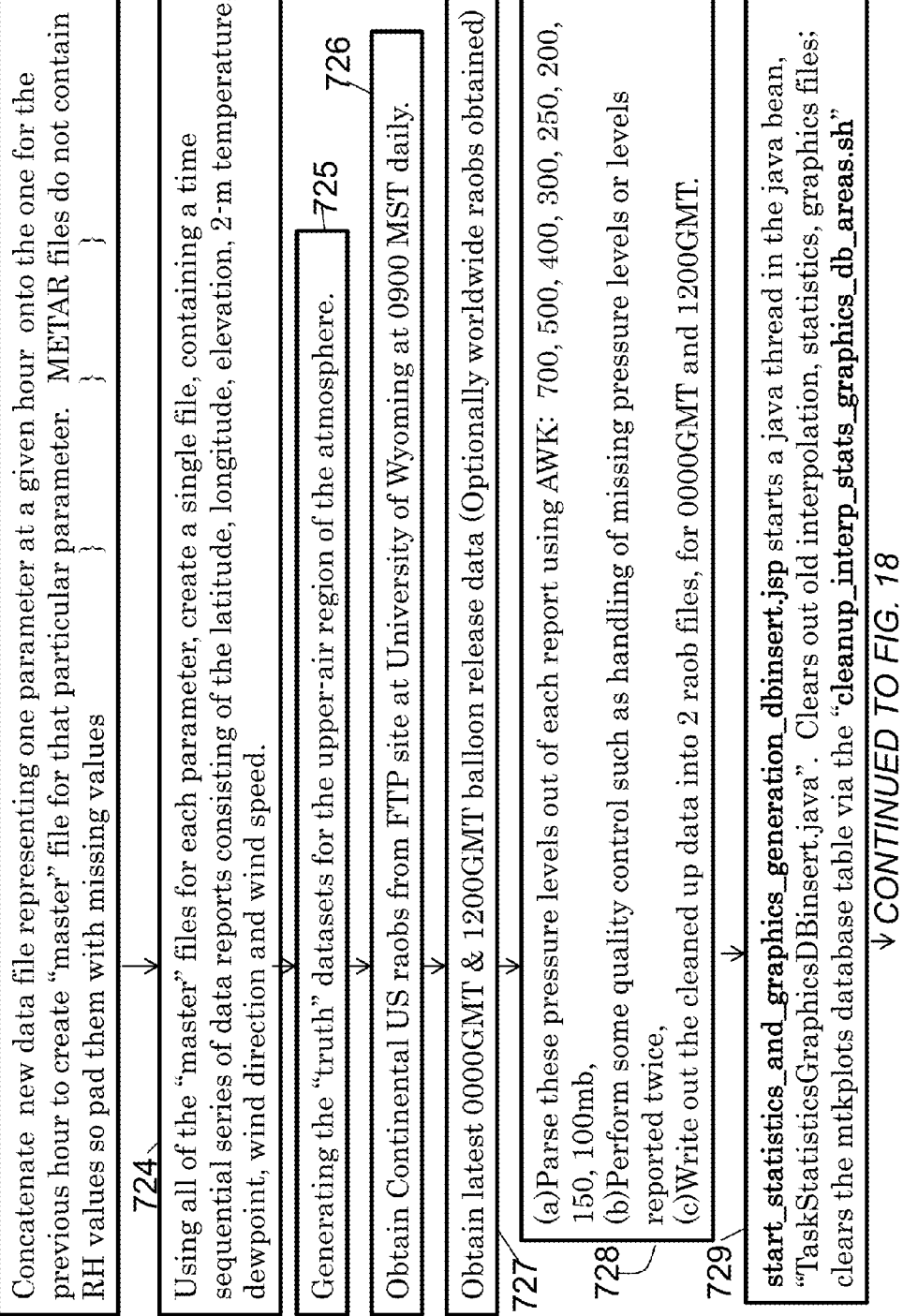

FIG. 17 Generate Statistics/Graphics (PART 3) FLOW CHART (CONTINUED FROM FIG. 16)

722 — Concatenate new data file representing one parameter at a given hour onto the one for the previous hour to create "master" file for that particular parameter. METAR files do not contain RH values so pad them with missing values 724 — Using all of the "master" files for each parameter, create a single file, containing a time sequential series of data reports consisting of the latitude, longitude, elevation, 2-m temperature, dewpoint, wind direction and wind speed.

725 — Generating the "truth" datasets for the upper-air region of the atmosphere.

726 — Obtain Continental US raobs from FTP site at University of Wyoming at 0900 MST daily.

727 — Obtain latest 0000GMT & 1200GMT balloon release data (Optionally worldwide raobs obtained)

728 — (a) Parse these pressure levels out of each report using AWK: 700, 500, 400, 300, 250, 200, 150, 100mb.
(b) Perform some quality control such as handling of missing pressure levels or levels reported twice,
(c) Write out the cleaned up data into 2 raob files, for 0000GMT and 1200GMT.

729 — start_statistics_and_graphics_generation_dbinsert.jsp starts a java thread in the java bean, "TaskStatisticsGraphicsDBinsert.java". Clears out old interpolation, statistics, graphics files; clears the mtkplots database table via the "cleanup_interp_stats_graphics_db_areas.sh"

↓ CONTINUED TO FIG. 18

FIG. 18 Generate Statistics/Graphics (PART 4) FLOW CHART
(CONTINUED FROM FIG. 17)

730 — Interpolates MM5 output to surface report locations via the "GO.gen_mm5_analysis_file_surface.1and2.gfs.nam.nogaps" script 731 — Interpolation methodology employed is bilinear interpolation carried out for parameters comprising u- & v-components of the surface wind, 2-m temperature, and relative humidity.

732 — Model data is interpolated to enable direct comparison of a MM5 model output value with a station report value (at locations).

732 — When a station report is found to lie inside the MM5 domain, a MM5 interpolated value is generated by interpolating the 4 MM5 grid point values which surround the station report using the latitude and longitude values for the surrounding MM5 grid points, the latitude and longitude values for the surface report as well as the surface report parameter value. The final product contains co-located values from MM5 output and the station reports.

734 — Interpolates WRF-ARW output to surface report locations via the GO.gen_wrf_analysis_file_surface.1and2.gfs.nam.nogaps" script (mimics the MM5 process described above in Boxes 730-732.

↓ CONTINUED TO FIG. 19

FIG. 19 Generate Statistics/Graphics (PART 5) FLOW CHART
(CONTINUED FROM FIG. 18)

735 — Interpolate MM5 output to raob locations via the "GO.gen_mm5_analysis_file_vertical.1and2.gfs.nam.nogaps" script.

736 — First MM5 output is interpolated onto pre-designated pressure levels using the MM5 "interpb" FORTRAN program.

737 — Then bilinear interpolation is carried out at each of these pressure levels – 700, 500, 400, 300, 250, 200, 150, 100mb, as described above in order to create co-located values for each parameter for the MM5 output and raob reports 738 — Interpolates WRF-ARW output to raob locations via the "GO.gen_wrf_analysis_file_vertical.1and2.gfs.nam.nogaps" script.

739 — First WRF-ARW output is interpolated to pressure levels using WRFPOST code.

740 — Then bilinear interpolation is carried out at each of these pressure levels – 700, 500, 400, 300, 250, 200, 150, 100mb as described above in order to create co-located values for each parameter for the WRF-ARW output and raob reports.

CONTINUED TO FIG. 20

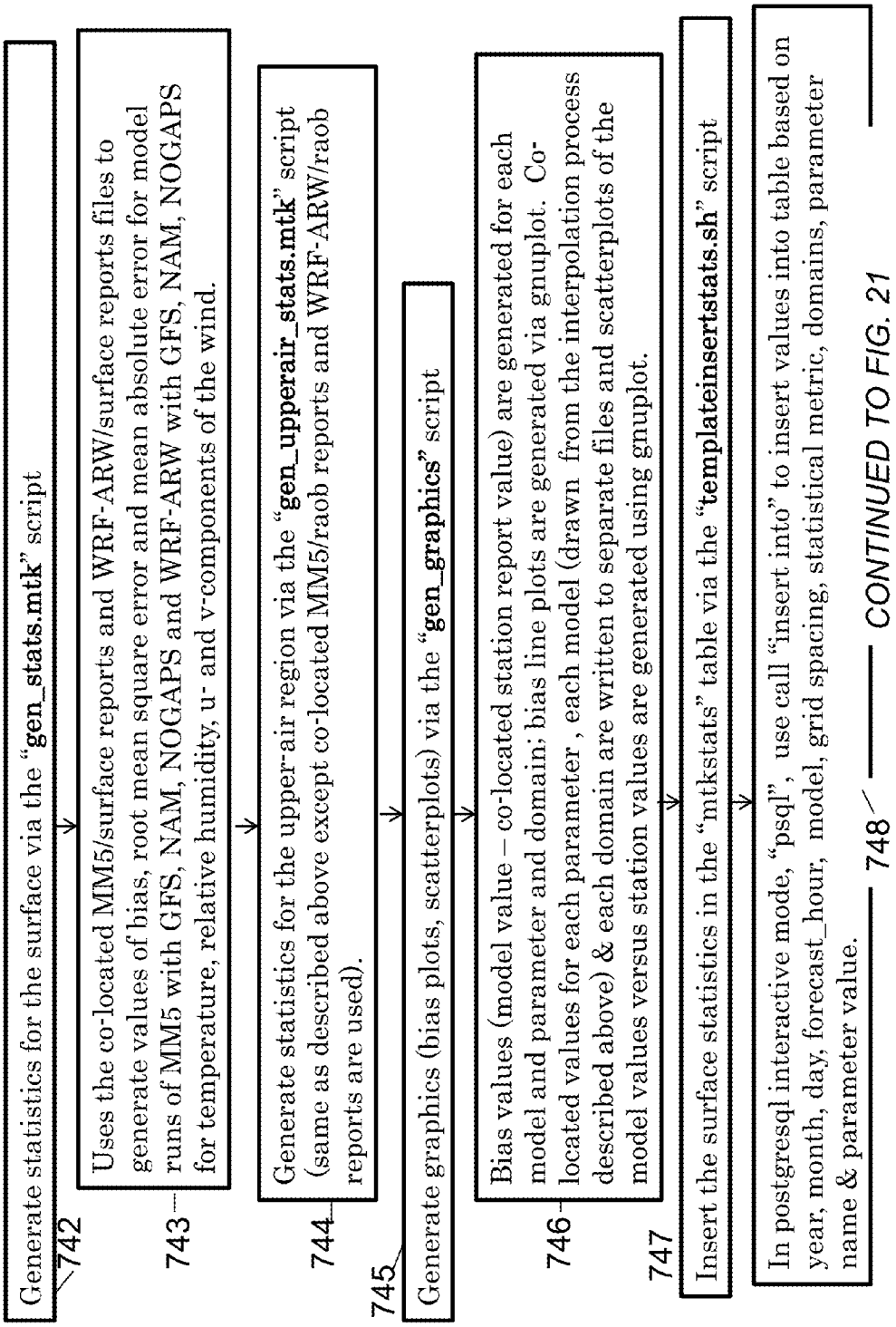

FIG. 20 Generate Statistics/Graphics (5) FLOW CHART CONT. FROM FIG.19

742 — Generate statistics for the surface via the "gen_stats.mtk" script

743 — Uses the co-located MM5/surface reports and WRF-ARW/surface reports files to generate values of bias, root mean square error and mean absolute error for model runs of MM5 with GFS, NAM, NOGAPS and WRF-ARW with GFS, NAM, NOGAPS for temperature, relative humidity, u- and v-components of the wind.

744 — Generate statistics for the upper-air region via the "gen_upperair_stats.mtk" script (same as described above except co-located MM5/raob reports and WRF-ARW/raob reports are used).

745 — Generate graphics (bias plots, scatterplots) via the "gen_graphics" script 746 — Bias values (model value – co-located station report value) are generated for each model and parameter and domain; bias line plots are generated via gnuplot. Co-located values for each parameter, each model (drawn from the interpolation process described above) & each domain are written to separate files and scatterplots of the model values versus station values are generated using gnuplot.

747 — Insert the surface statistics in the "mtkstats" table via the "templateinsertstats.sh" script 748 — In postgresql interactive mode, "psql", use call "insert into" to insert values into table based on year, month, day, forecast_hour, model, grid spacing, statistical metric, domains, parameter name & parameter value.

CONTINUED TO FIG. 21

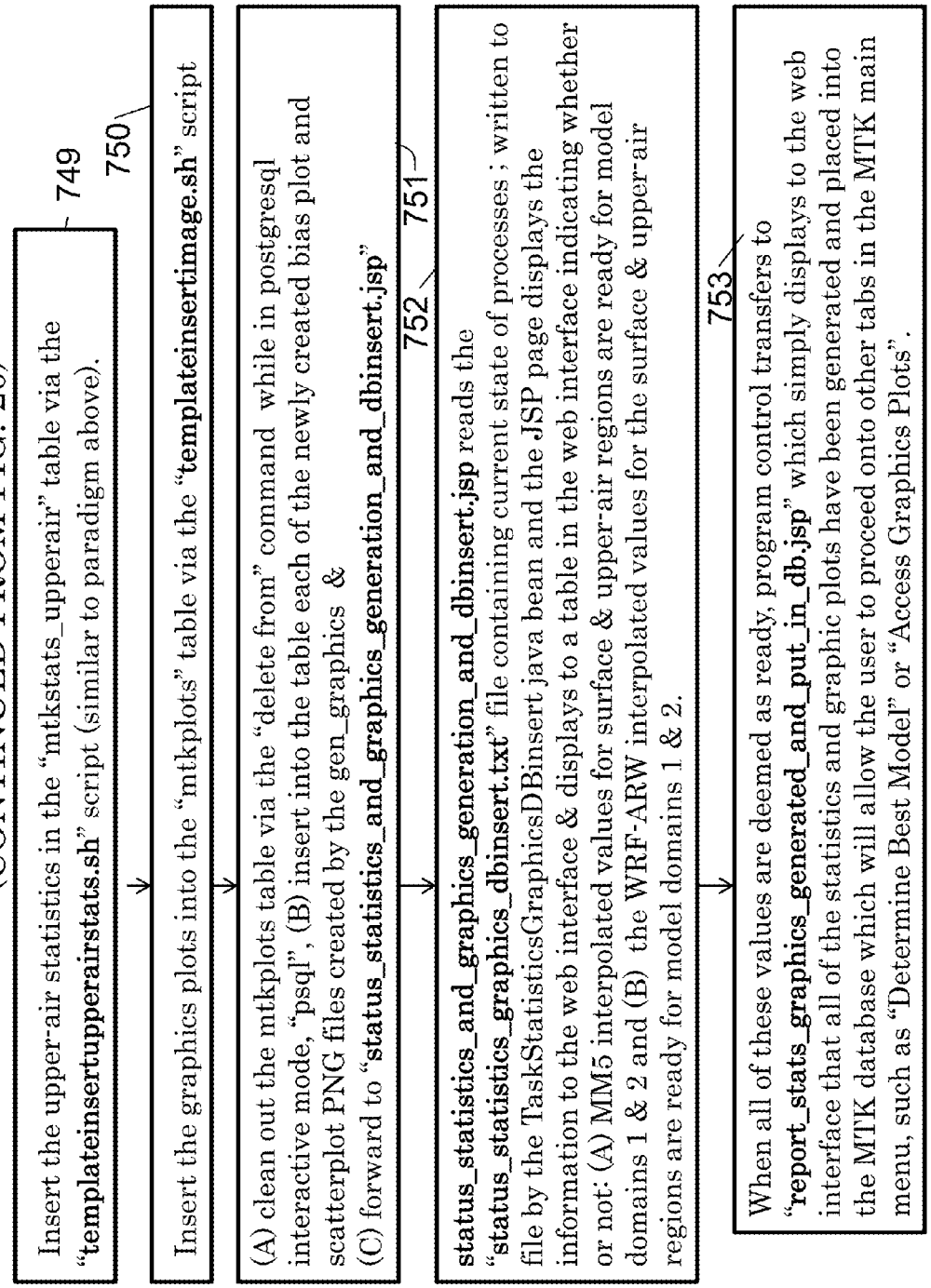

FIG. 21 Generate Statistics/Graphics (PART 7) FLOW CHART (CONTINUED FROM FIG. 20)

Insert the upper-air statistics in the "mtkstats_upperair" table via the "templateinsertupperairstats.sh" script (similar to paradigm above). — 749

Insert the graphics plots into the "mtkplots" table via the "templateinsertimage.sh" script — 750

(A) clean out the mtkplots table via the "delete from" command while in postgresql interactive mode, "psql", (B) insert into the table each of the newly created bias plot and scatterplot PNG files created by the gen_graphics & (C) forward to "status_statistics_and_graphics_generation_and_dbinsert.jsp" — 752 status_statistics_and_graphics_generation_and_dbinsert.jsp reads the "status_statistics_graphics_dbinsert.txt" file containing current state of processes ; written to file by the TaskStatisticsGraphicsDBinsert java bean and the JSP page displays the information to the web interface & displays to a table in the web interface indicating whether or not: (A) MM5 interpolated values for surface & upper-air regions are ready for model domains 1 & 2 and (B) the WRF-ARW interpolated values for the surface & upper-air regions are ready for model domains 1 & 2. — 751

When all of these values are deemed as ready, program control transfers to "report_stats_graphics_generated_and_put_in_db.jsp" which simply displays to the web interface that all of the statistics and graphic plots have been generated and placed into the MTK database which will allow the user to proceed onto other tabs in the MTK main menu, such as "Determine Best Model" or "Access Graphics Plots". — 753

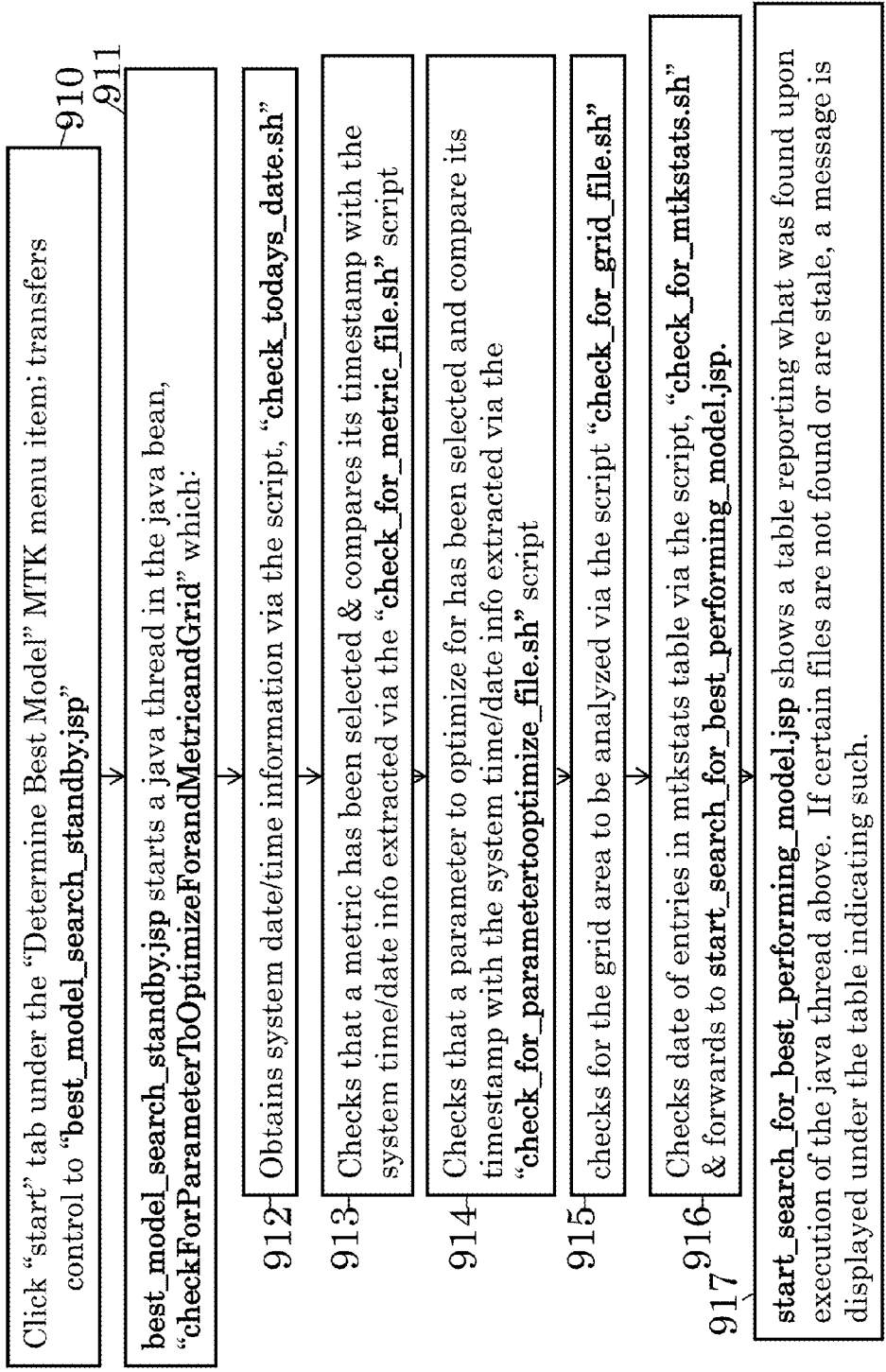
FIG. 22 Determine Best Model Flow Chart (Part1)

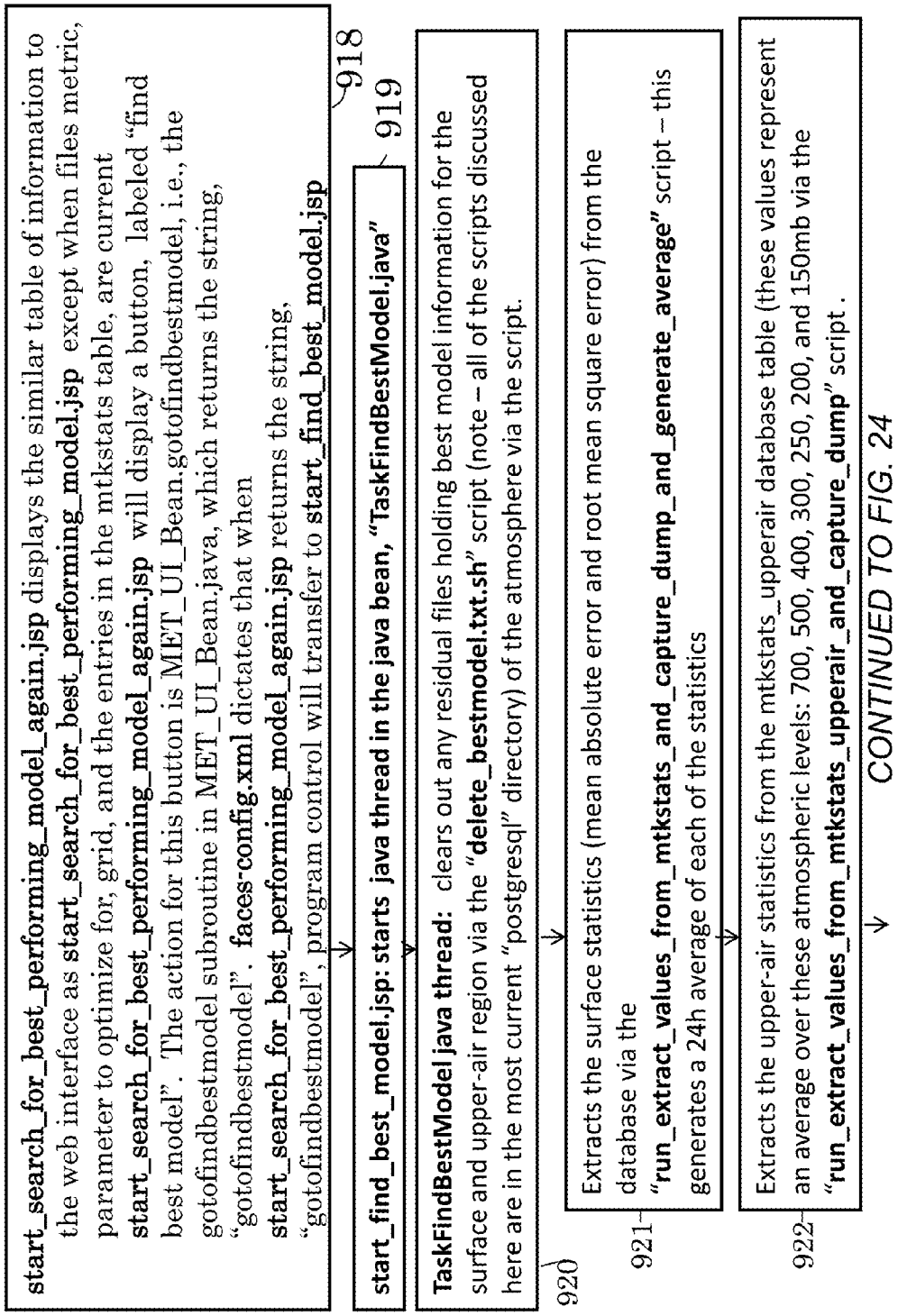
FIG. 23 Determine Best Model Flow Chart (Part2 – Cont. from FIG. 22)

FIG. 24 Determine Best Model Flow Chart (Part 3 – Cont. from FIG. 23)

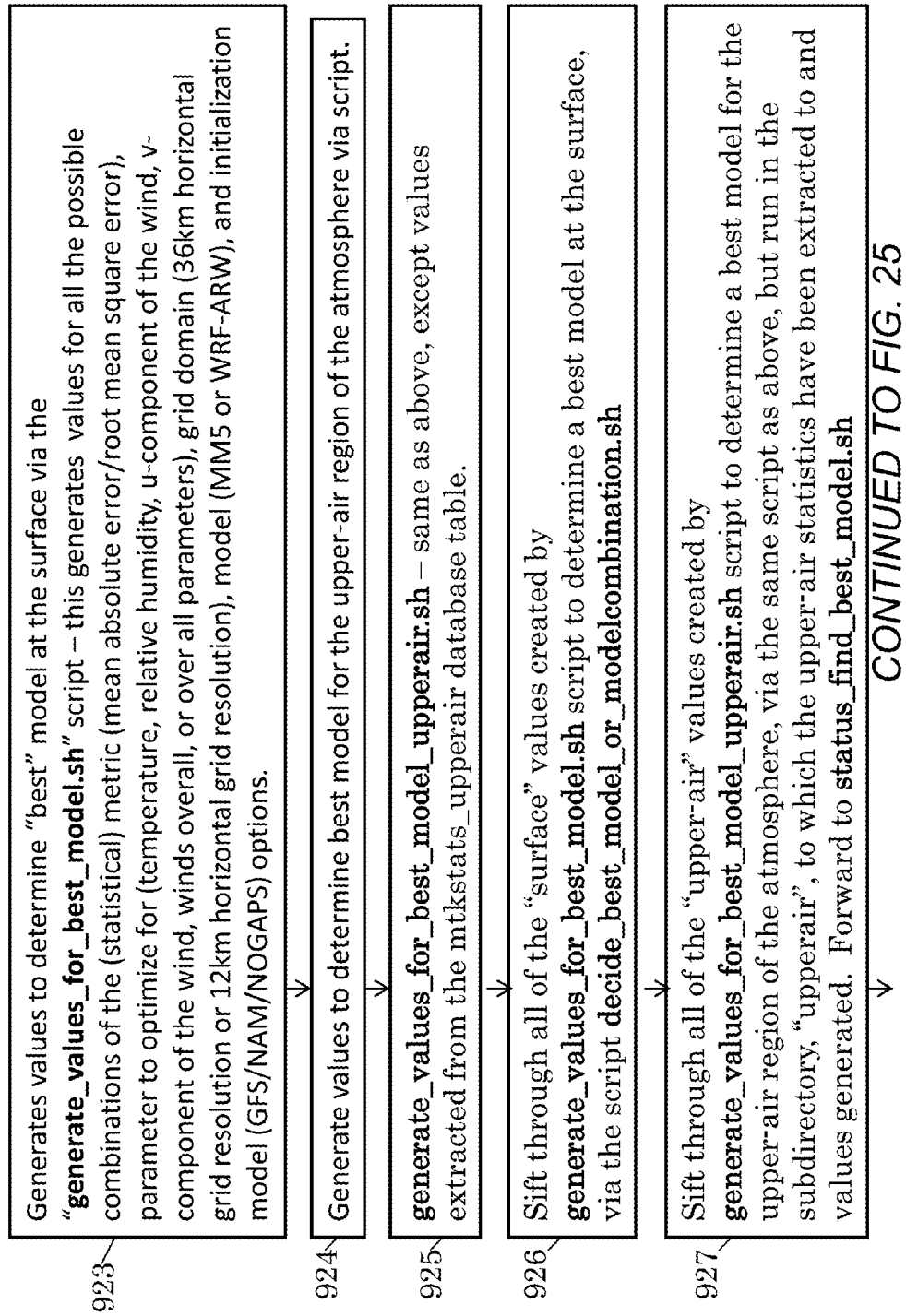

923 — Generates values to determine "best" model at the surface via the "generate_values_for_best_model.sh" script – this generates values for all the possible combinations of the (statistical) metric (mean absolute error/root mean square error), parameter to optimize for (temperature, relative humidity, u-component of the wind, v-component of the wind, winds overall, or over all parameters), grid domain (36km horizontal grid resolution or 12km horizontal grid resolution), model (MM5 or WRF-ARW), and initialization model (GFS/NAM/NOGAPS) options.

924 — Generate values to determine best model for the upper-air region of the atmosphere via script.

925 — generate_values_for_best_model_upperair.sh – same as above, except values extracted from the mtkstats_upperair database table.

926 — Sift through all of the "surface" values created by generate_values_for_best_model.sh script to determine a best model at the surface, via the script decide_best_model_or_modelcombination.sh

927 — Sift through all of the "upper-air" values created by generate_values_for_best_model_upperair.sh script to determine a best model for the upper-air region of the atmosphere, via the same script as above, but run in the subdirectory, "upperair", to which the upper-air statistics have been extracted to and values generated. Forward to status_find_best_model.sh

*CONTINUED TO FIG. 25*

FIG. 25 Determine Best Model Flow Chart (Part 4 –Cont. from FIG. 24)

status_find_best_model.jsp - The value "status_find_best_model.txt" is constantly being updated and written to file, by the java bean, TaskFindBestModel.java, then read in by status_find_best_model.jsp and displayed to the user in the web interface. This string will reflect the current activity in the best model search process, such as verifying the date/timestamp of the metric, parameter to optimize for, grid chosen for analysis, extraction of data from the mtkstats or mtkstats_upperair database tables, generating 24h averages of from these extracted values, generating values to determine a best model (i.e., generating all of the combinations as described previously, given: a metric, a parameter to optimize for, a grid, the mesoscale models (MM5,WRF-ARW), and the initialization models (GFS, NAM, and NOGAPS), and lastly, sifting through these values, based on the particular values chosen for metric, parameter to optimize for, and grid options by the user, then writing the "winning" (i.e., smallest mean absolute error or root mean square error, given the user selections) models to the files, "bestmodelsurface.txt" and "bestmodelupperair.txt

⟶ 928  929 ⟶

Finally, when the boolean subroutines, "existsbestmodelsurface" and "existsbestmodelupperair", in the java bean, TaskFindBestModel, both return "true", program focus transfers to the JSP page, "report_best_model.jsp".

⟶ 930 report_best_model.jsp reads in the values stored in the files - "metric.txt", "parametertooptimizefor.txt", "grid.txt", "bestmodelsurface.txt", and "bestmodelupperair.txt" and displays these user-selected choices along with the optimum models for the surface and the upper-air regions, to the web interface.

METHOD AND SYSTEM FOR DETERMINING ACCURACY OF A WEATHER PREDICTION MODEL

GOVERNMENT INTEREST

The invention described herein may be manufactured, used and licensed by or for the U.S. Government.

FIELD OF INVENTION

Embodiments of the present invention generally relate to software applications and, more particularly, to a method and system for determining accuracy of mesoscale weather models.

BACKGROUND OF THE INVENTION

Mesoscale modeling refers to weather models for domain areas from 10-1000 kilometers, used for predicting future weather conditions. Generally, there are several current popular weather models including Fifth Generation Mesoscale Model (MM5), Weather Research and Forecasting-Advanced Research Weather Research Forecasting (WRF-ARW), Weather Research and Forecasting-Nonhydrostatic Mesoscale Model (WRF-NMM) and Advanced Regional Prediction System (ARPS). Currently, determining the "best" model over the most recent 24 hour period based on accuracy of the model output parameters involves extensive scripting and setup, creating a high possibility of error, and minimizing repeatability of the model execution.

Creating input meteorological data files for mesoscale modeling is a daunting task for the uninitiated researcher working on a case study. The researcher/user is required to know what data should be acquired and where to obtain it from and to run a complex sequence of scripts, modifying variables and file locations, C and FORTRAN code modifications and recompilations. Specifically, as part of the C gridded binary (GRIB) decoder, the user must indicate where the output decoded GRIB file should be placed. In the FORTRAN file, edits are required regarding central latitude and longitude, output file names, etc. Each of these code changes would be followed by recompilation. If the user mistypes any of the parameters, additional changes and recompilations must be made, leading to a highly error-prone and time consuming process.

Therefore, there is a need in the art for a method and apparatus for determining accuracy of mesoscale weather modelsin an easy-to-use and efficient manner.

BRIEF SUMMARY OF THE INVENTION

Embodiments of the present invention relate to a computer implemented method for determining accuracy of mesoscale weather models. A preferred embodiment comprises selecting user parameters, extracting data corresponding to the selected user parameters from initialization data, executing each of the plurality of mesoscale weather models using the data to generate output data, comparing the output data to expected truth data and selecting at least a first mesoscale weather model ascertained for a surface level and a second mesoscale weather model ascertained for an upper-air level from the plurality of mesoscale weather models, wherein the first and second selected mesoscale weather models of the plurality of mesoscale weather models have a lowest error at the surface level and the upper-air level based on the selected user parameters.

Another embodiment of the present invention relates to apparatus for selecting a mesoscale weather model from a plurality of mesoscale weather models comprising selecting user parameters and extracting data corresponding to the selected user parameters from initialization data, executing each of the plurality of mesoscale models based on the selected user parameters to generate output data, comparing the output data to actual data and selecting at least a first mesoscale weather model ascertained for a surface level and/or a second mesoscale weather model ascertained for an upper-air level from the plurality of mesoscale weather models, wherein the first and/or second mesoscale weather models have a lowest error at the surface level and/or the upper-air level based on the selected user parameters.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 10 illustrates a schematic overview of a preferred embodiment program menu showing menu tabs 1-3.

FIG. 11 illustrates a schematic overview of a preferred embodiment program menu showing menu tabs 4-6(part1).

FIG. 12 illustrates a schematic overview of a preferred embodiment program menu showing menu tabs 6 (part 2) and 7.

FIG. 13 illustrates a schematic overview of a preferred embodiment program menu showing menu tabs 8 and 9.

FIG. 14 is a schematic depiction of the program section "Determine Best Model" depicting both surface and upper-air inputs.

FIG. 15 depicts part 1 of a flow chart for program section "Generate Statistics/Graphics."

FIG. 16 depicts part 2 of a flow chart for program section "Generate Statistics/Graphics."

FIG. 17 depicts part 3 of a flow chart for program section "Generate Statistics/Graphics."

FIG. 18 depicts part 4 of a flow chart for program section "Generate Statistics/Graphics."

FIG. 19 depicts part 5 of a flow chart for program section "Generate Statistics/Graphics."

FIG. 20 depicts part 6 of a flow chart for program section "Generate Statistics/Graphics."

FIG. 21 depicts part 7 of a flow chart for program section "Generate Statistics/Graphics."

FIG. 22 depicts part 1 of a flow chart for program section "Determine Best Model."

FIG. 23 depicts part 2 of a flow chart for program section "Determine Best Model."

FIG. 24 depicts part 3 of a flow chart for program section "Determine Best Model."

FIG. 25 depicts part 4 of a flow chart for program section "Determine Best Model."

DETAILED DESCRIPTION

Embodiments of the present invention comprise a method and apparatus for determining an ideal mesoscale weather model by executing each model using a grouping of parameters and comparing each weather model to determine which has a lowest error according to the selected parameters and user-selected statistical metric.

Figure 1:
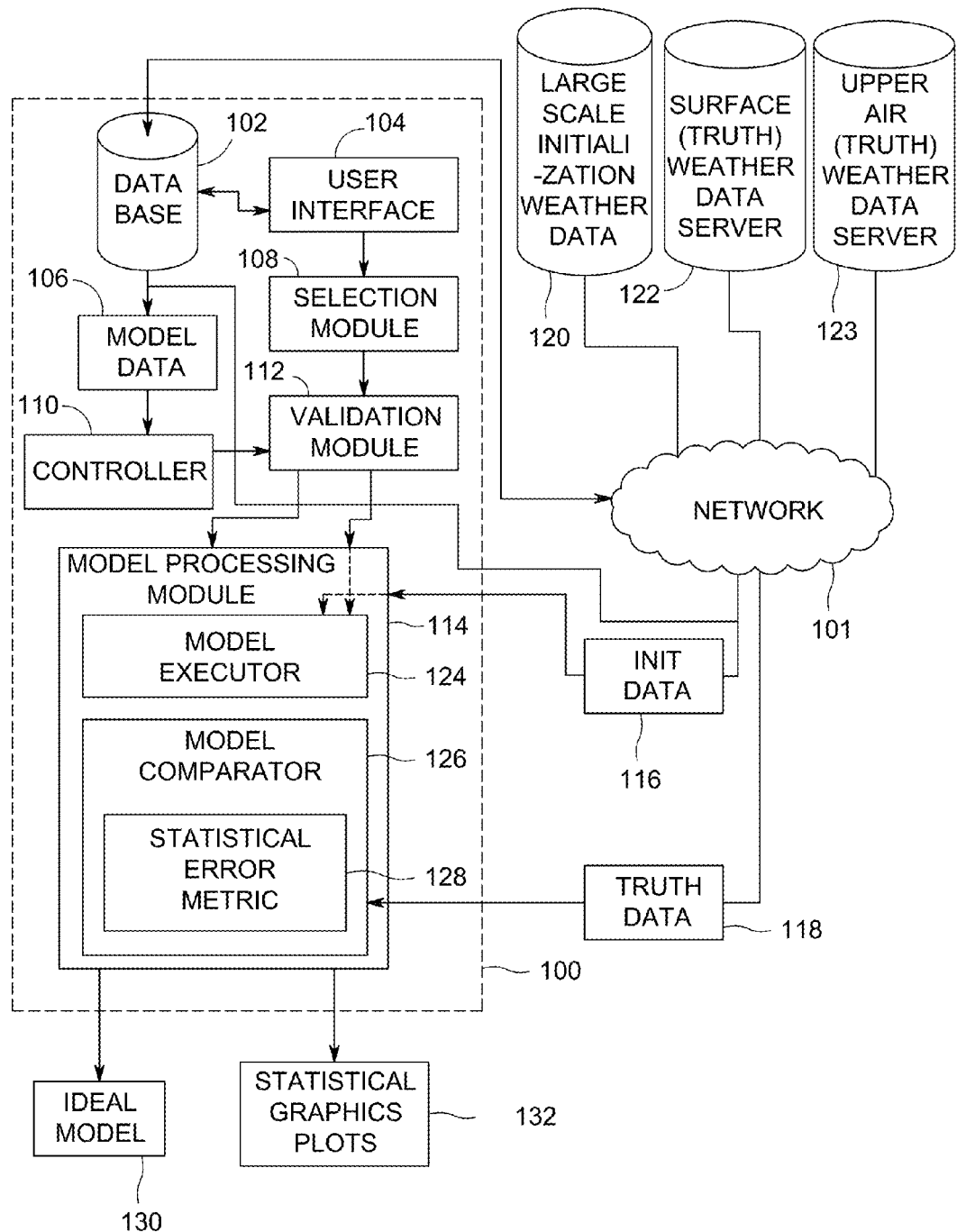
FIG. 1 depicts a functional block diagram of an apparatus for determining an ideal mesoscale weather model in accordance with at least one exemplary embodiment of the present invention.

FIG. 1 is a functional block diagram of an apparatus 100 for determining an ideal mesoscale weather model in accordance with at least one exemplary embodiment of the present invention. Apparatus 100 comprises an internal database 102, a user interface (UI) 104, model data 106, a selection module 108, a compiler 110, a validator 112 and a model processing module 114. The model processing module 114 comprises a model executor 124 and a model comparator 126. The model comparator 126 further comprises a statistical error module 128. The apparatus 100 requests and receives initialization data 116 and truth data 118, respectively, from an external initialization data source 120, and truth data sources 122 and 123 across a network 101. The apparatus 100 outputs the determined ideal model 130 as well as graphical plots 132 representing the comparisons.

The user interface 104 allows a user to drive the apparatus 100 to determine a best model of mesoscale weather data. The selection module 108 determines the selections of the geographical area for performing the mesoscale models, the selection of weather parameters to optimize the models for, the selection of physics packages to apply for each model, the selection of an error metric and model resolution (coarser/finer). The database 102 stores information relating to model data as well as data corresponding to the selection options available to users in the user interface 104. Model data 106 is extracted from the database 102 and the model is compiled by the compiler 110. Both the compiled model data 110 and the selection parameters in the selection module 108 are validated by the validator 112. The validator 112 first confirms that the selection parameters and the model are compatible. Then the validator 112 confirms that the selection parameters are compatible between themselves. For example, if the user selects a physics package which does not align with a certain model, then the UI 104 displays an error. In an exemplary embodiment, the models used in model data 106 comprise at least two of the Fifth Generation Mesoscale Model (MM5), Weather Research and Forecasting-Advanced Research Weather Research Forecasting (WRF-ARW), Weather Research and Forecasting-Nonhydrostatic Mesoscale Model (WRF-NMM) or Advanced Regional Prediction System (ARPS), and the like.

Figure 2:
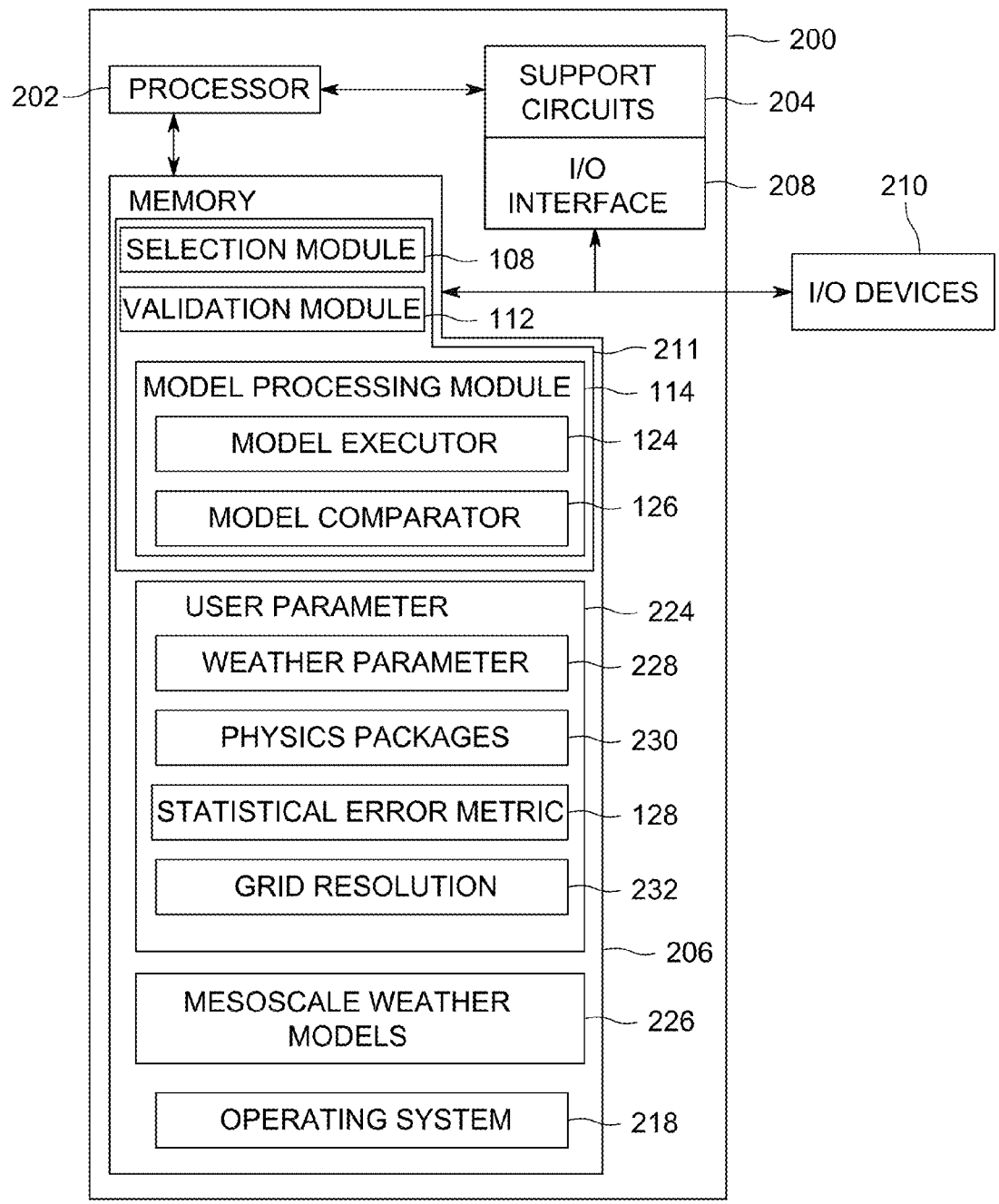
FIG. 2 depicts a block diagram of an exemplary embodiment of a computer system in accordance with an exemplary embodiment of the present invention.

FIG. 2 is a block diagram of an exemplary embodiment of a computer system 200 in accordance with one or more aspects of the present invention. The computer system 200 may be used to implement the apparatus 100 (shown in FIG. 1). The computer system 200 includes a processor 202, various support circuits 204, and memory 206. The processor 202 may include one or more microprocessors known in the art. The support circuits 204 for the processor 202 include conventional cache, power supplies, clock circuits, data registers, I/O interfaces 208, and the like. The I/O interface 208 may be directly coupled to the memory 206 or coupled through the supporting circuits 204. The I/O interface 208 may also be configured for communication with input devices and/or output devices 210, such as, network devices, various storage devices, mouse, keyboard, display, and the like.

The memory 206, or computer readable medium, stores non-transient processor-executable instructions and/or data that may be executed by and/or used by the processor 202. These processor-executable instructions may comprise firmware, software, and the like, or some combination thereof. Modules having processor-executable instructions that are stored in the memory 206 comprise a Model Tool Kit (MTK) module 211 which further comprises a selection module 108, a validation module 112, and a model processing module 114 comprising a model executor 124 and a model comparator 126. The memory 206 also stores selected user parameters 224, comprising weather parameters 228, physics package 230 and statistical error metric 128, the mesoscale weather models 226 and the grid resolution 232. The computer system 200 may be programmed with one or more operating systems (generally referred to as operating system (OS) 218), which may include OS/2, Java Virtual Machine, Linux, Solaris, Unix, HPUX, AIX, Windows, Windows95, Windows98, Windows NT, and Windows2000, WindowsME, WindowsXP, Windows Server, among other known platforms. At least a portion of the operating system 218 may be disposed in the memory 206. The memory 206 may include one or more of the following random access memory, read only memory, magneto-resistive read/write memory, optical read/write memory, cache memory, magnetic read/write memory, and the like, as well as signal-bearing media, excluding non-transitory signals such as carrier waves and the like.

Figure 3:
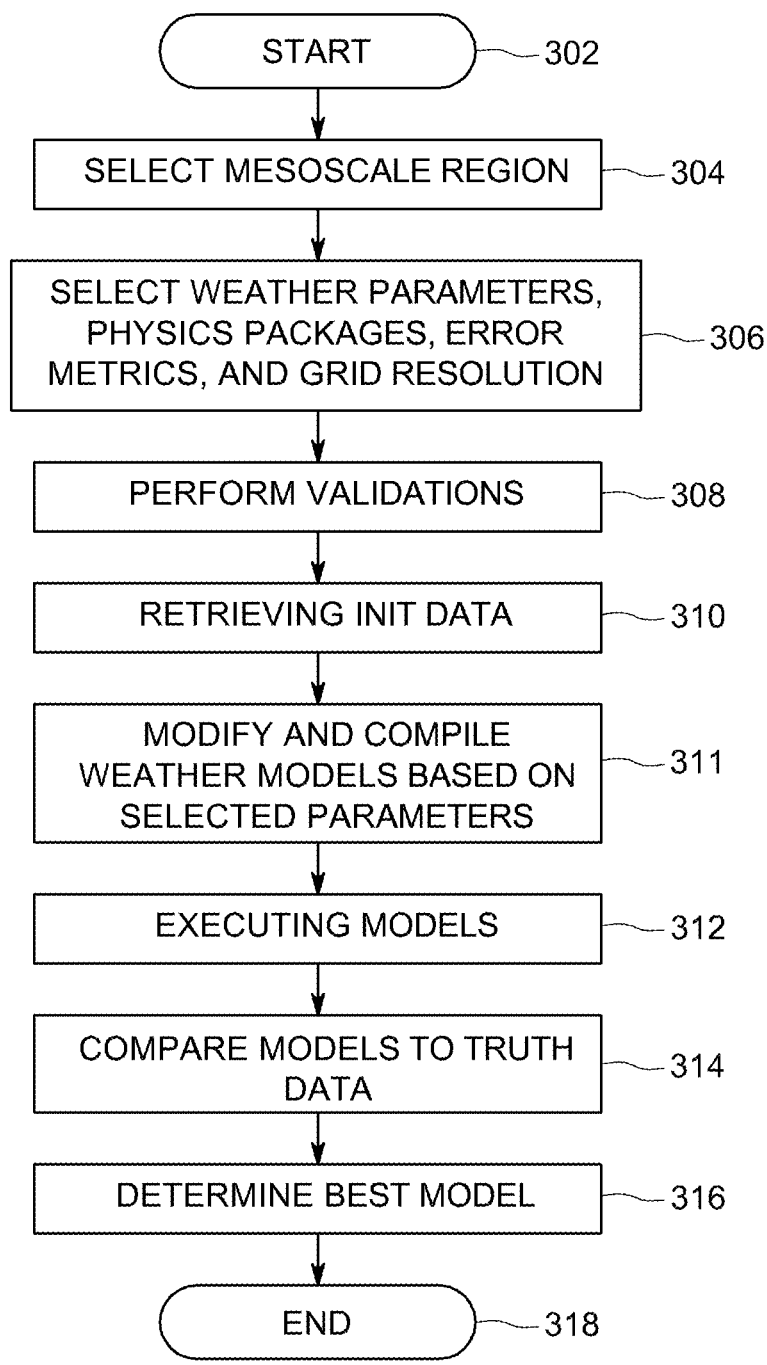
FIG. 3 depicts a flow diagram of an overview of the operation of the apparatus of FIG. 1 in accordance with an exemplary embodiment of the present invention.

FIG. 3 is a flow diagram depicting a method 300 of operation of the apparatus 100 in accordance with embodiments of the present invention. FIG. 3 represents an implementation of the method for Model Tool Kit module 211, stored in memory 206 and executed by the processor 202 in FIG. 2. The method 300 starts at step 302 and proceeds to step 304. At step 304 a user selects a mesoscale region as part of the domain model upon which the mesoscale models will be executed. At step 306, the user selects weather parameters, physics packages for each mesoscale model, a grid resolution, and a statistical error metric for the domain model. At step 308, the validation module 112 performs validations on the selected user parameters. This entails confirming that the selected weather parameters, physics packages and the like are all compatible with each other. At step 310, the initialization data 116 is retrieved from the local database 102 required for execution of the mesoscale models. At step 311, the mesoscale models are modified according to the selected user parameters and compiled into executable computer programs. At step 312, the mesoscale model computer programs are executed by the model executor 124. At step 314, the executed mesoscale model outputs are compared with each other as well as truth data 118. At step 316, based on the chosen error metric, grid resolution, and model parameter grouping from step 306, an idealmesoscale weather model is determined for both the surface level and the upper level. The method 300 ends at step 318.

Figure 4:
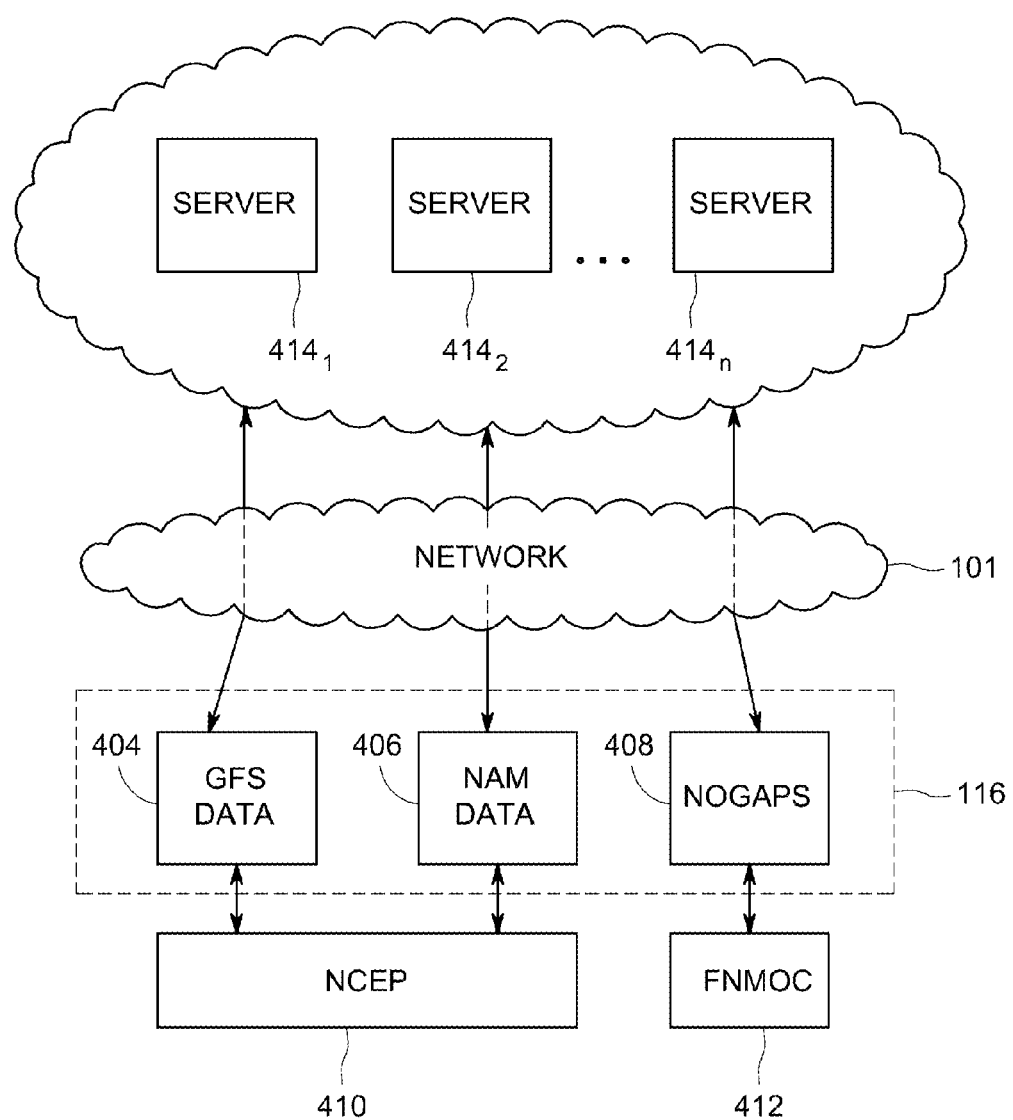
FIG. 4 depicts a functional block diagram of the operation of obtaining initialization data in the apparatus of FIG. 1 according to an exemplary embodiment of the present invention.

FIG. 4 is a functional block diagram of the operation of obtaining initialization data in the system 100 according to an exemplary embodiment of the present invention. The initialization data 402 is obtained from several sources. According to an exemplary embodiment, the initialization data 116 comprises Global Forecast System (GFS) 404, North America Model (NAM) 406 and Navy Operational Global Atmospheric Prediction System (NOGAPS) 408, and provides background fields that serve as a model starting point. To establish the ideal mesoscale model, the apparatus 100 examines all of the model runs (ex. MM5 run with GFS for initialization, WRF-ARW run with NAM, etc.). Both the GFS and NAM models are obtained from the National Center for Environmental Prediction (NCEP) data source 410 while NOGAPS is obtained from the Navy at the Fleet Numerical Meteorology and Oceanography Center (FNMOC) data source 412. The MM5 and WRF models are "community" models, i.e., the developers come from both the National Center for Atmospheric Research and academia. The ARPS model is developed by the University of Oklahoma. The servers $414_{1...n}$ perform TCP/IP requests across the network 416 to obtain the initialization data 116 from the various sources, through file transfer protocol (FTP) and other means. According to an exemplary embodiment, the servers $414_{1...n}$ are a part of a Linux cluster, allowing for parallel execution and thus making feasible a 3 km/1 km domain nesting scenario.

Figure 5:
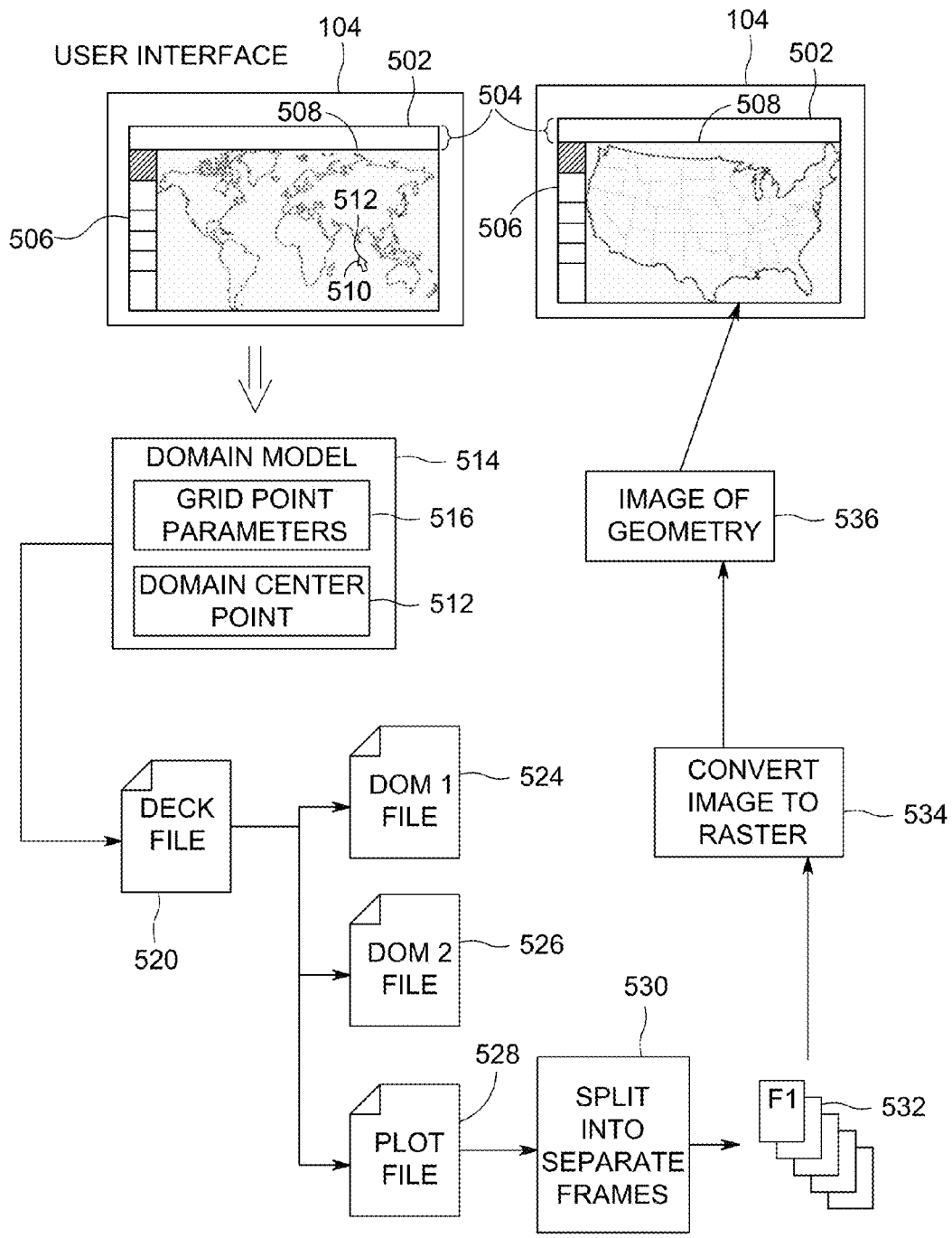
FIG. 5 depicts a functional block diagram depicting the generation of a domain model according to user selection in accordance with embodiments of the present invention.

FIG. 5 is a functional block diagram depicting the generation of a domain model according to user selection in accordance with embodiments of the present invention. Initially, a user launches user interface 104 displaying a website 502 for MTK. The website 502 is divided into a header 504, a menu 506 and a main content area 508. From the menu 506, the user selects the set model domain tab. In the content area 508, the user selects a sub-area of the world (e.g. US/CANADA) which triggers a display of that particular sub-map of the world with latitude and longitudinal lines. The user uses the cursor 510 to select a domain center point 512 on the map. Based on the user's selection, a domain model 514 is generated which comprises grid point parameters 516 and domain center point information 512. The grid point parameters 516 contain latitudinal and longitudinal information and land-use/elevation information, according to an exemplary embodiment. The user is also able to select a coarse-grain domain (a coarser-grained domain with a nested coarse-grained domain) or a fine-grained domain (a finer-grained domain with a nested fine-grained domain). The domain model 514 allows the apparatus 100 to generate a "terrain.deck" file 520 where the domain is designated and the number of grid-points in the x and y direction for both the outer and nested grid are listed along with the type of map projection (Mercator, Equidirectional, and the like) and grid resolution.

The "terrain.deck" file 520 is executed by processor 202 to generate a "TERRAIN_DOMAIN1" file 524, "TERRAIN_DOMAIN2" file 526 and the "TER.PLT" (plot) file 528. The plot file 528 consists of 15 plots depicting various aspects of the two selected domains, such as the domains displayed separately and with contoured height fields. In order to extract the desired frame, the National Center for Atmospheric Research (NCAR) Command Language (NCL) graphics binary med 530 is first executed using the processor 202 to split the plot file into 15 separate frames 532. The metafile information in the desired frame amongst the frames 532 is converted from a metafile using an NCL binary "ctrans" 534, running on processor 202. Ctrans 534 converts the metafile for the desired frame (frame 8) into a raster format of the generated image file 536 so a user can view the geometry of the nested domains in the main content area 508 of website 502.

Figure 6:
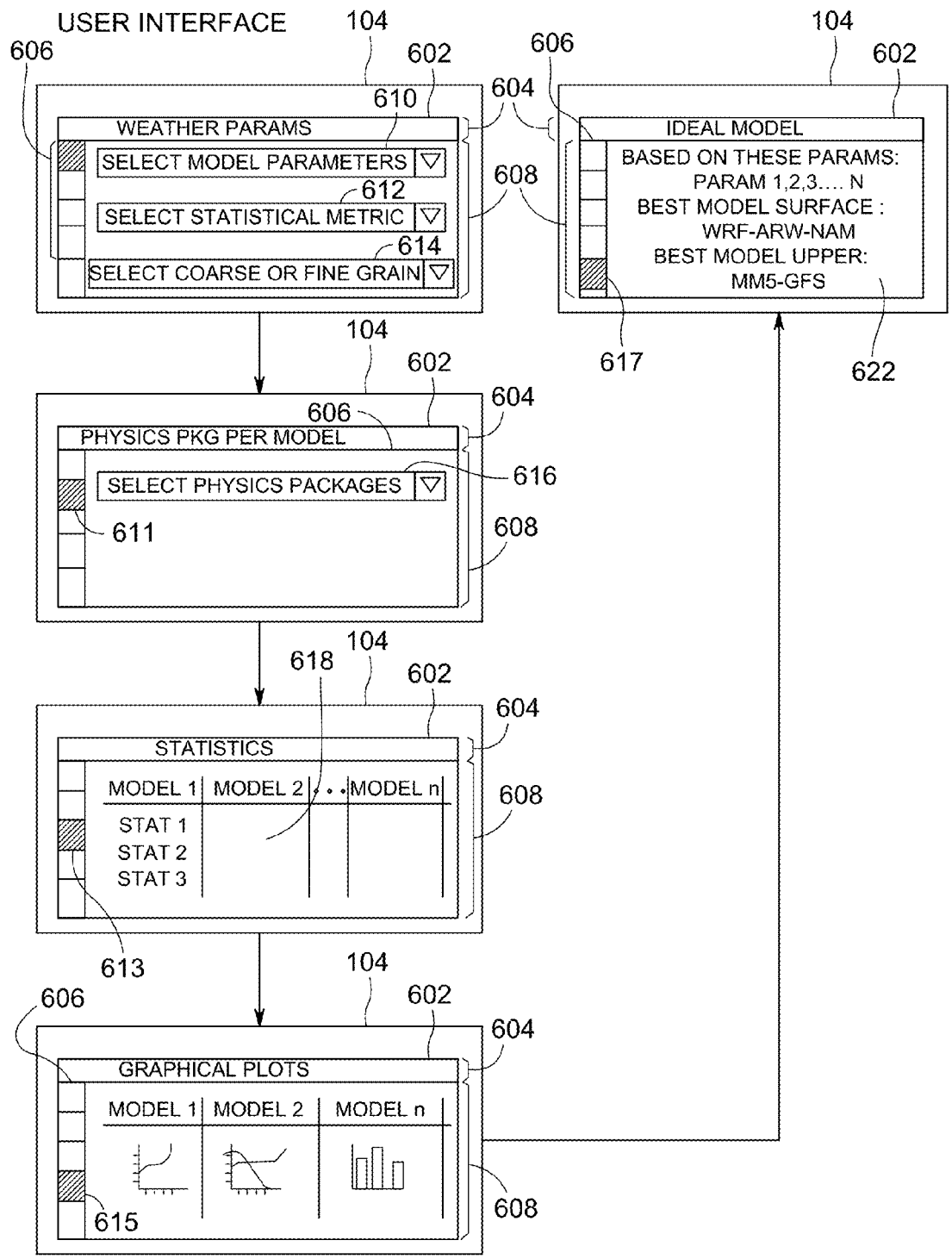
FIG. 6 depicts an illustration of an HTML website representing a users operation of the Model Tool Kit (MTK) for determining an ideal mesoscale weather model implemented in accordance with one or more aspects of the present invention.

FIG. 6 is an illustration of an HTML website representing a user's operation of the model tool kit for determining an ideal mesoscale weather model implemented in accordance with one or more aspects of the present invention. In other exemplary embodiments, the operations of the present invention are made available as web-services, mobile applications and the like. The user initially launches the user interface 104, with a website 602 comprising a header 604, a menu 606 and a content area 608. The content area 608 loads the first tab of the Model Tool Kit application, where a user selects weather parameters. A user can select weather parameters through select box 610 to optimize r, including, but not limited to, temperature (T), relative humidity (RH), the u-component of the wind, the v-component, winds overall (the average of u-, v-component) or all the parameters (the average of T, RH, u-, and v-components). In another exemplary embodiment, select box 610 is a multiple select box allowing a user to select multiple weather parameters. The user then selects a statistical metric using select box 612. The statistical metric is used to determine the ideal weather model numerically. Three different statistical measures are used in Model Tool Kit: the mean absolute error (MAE), the root mean square error (RMSE) and Newbold-Granger (N-G) weighting coefficients. For each grid domain and for each hour, a MAE and a RMSE are calculated. Ascertaining the relative strengths and weaknesses of each model when run with the different initialization data is important. Newbold-Granger weighting coefficients enable determining strengths and weaknesses and are used by MTK to determine a normalized weight for each model group ((1) MM5 run with GFS, NAM, and NOGAPS, and (2) WRF-ARW run with the same models) in reference to one of the 4 forecasted parameters.

The mean absolute error is determined using the following formula:

$$MAE = 1/n \sum_{k=1}^{n} |y_k - o_k|$$

Where $(y_k, o_k)$ is the kth of n pairs of forecasts and observations, and the MAE is the arithmetic average of the absolute values of the differences between the members of each pair. The root mean square error is determined according to the following formula:

$$\sqrt{1/N \sum_{n=1}^{N} (y_k - o_k)^2}$$

Where $y_k$ and $o_k$ are as described for MAE. N is the total number of data pairs. Finally, Newbold-Granger is determined according to the following formula:

$$w_{jf} = \left[ \sum_{t=T-v}^{T-1} (X_{Tf} - X_{jf}) \right]^{-2} / \sum_{k} \left[ \left( \sum_{t=T-v}^{T-1} X_{Tf} - X_{kf} \right) \right]^{-2}$$

Thus, the weight for one ensemble member (jf) equals the inverse square of the differences between the truth for the forecast (TO and the input forecast (jf) value summed over a given time window divided by the inverse square of the difference between the truth for the forecast and the ensemble member (kf) value summed over a given time window. This inverse square component in the denominator is then summed over all ensemble members. By virtue of introducing the term in the denominator, these weights are normalized.

The user also has the option to select either coarse-grained (36 km resolution outer domain and 12 km resolution nest) or fine-grained (3 km resolution outer domain and 1 km resolution nest) using selection box 614 according to an exemplary embodiment. The user selects tab 611 next to select the physics packages for each mesoscale model. For every mesoscale model executed by the system, the user must select appropriate physics packages, which will be validated by validator 112. Once a user has selected the weather parameters, the user selects the next tab 611 to select physics packages for each mesoscale model. Each model has its own set of physics "packages" which are parameterizations that model some physical aspect of the atmosphere, including, but not limited to radiation (shortwave and long-wave), the planetary boundary layer (typically the lowest 1 km of the atmosphere), soil moisture and temperature, cloud dynamics, and the like.

When the user selects tab 613, the MTK will determine the best model to use over the selected model parameters and physics packages according to the selected statistical error metric and grid resolution. The MTK displays calculated statistics 618 for each model in content area 608 according to the error metric for each model and are compared to determine the ideal model. In addition, the user selects tab 615 to view the associated graphical plots 620 for each model. Finally, a user selects tab 617 for calculating which mesoscale model is the ideal mesoscale model from the plurality of mesoscale models in the system 100 for both surface level and upper level analyses. The MTK displays the best performing model 622 for both the surface and upper-air atmospheric regions in content area 608.

Figure 7:
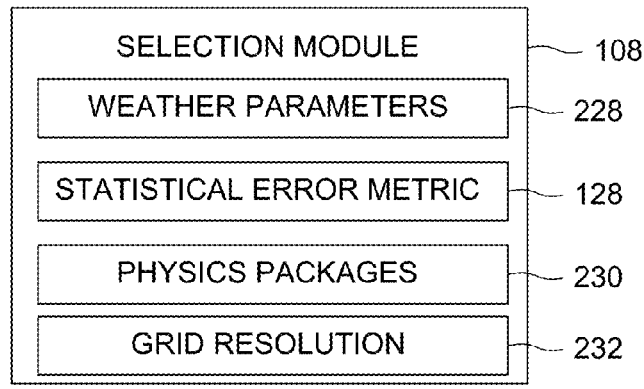
FIG. 7 depicts a block diagram of the selection module of FIG. 1 according to an exemplary embodiment of the present invention.

FIG. 7 is a block diagram of the selection module 108 of FIG. 1 according to an exemplary embodiment of the present invention. The selection module 108 contains the user selections from the user interface as described with reference to FIG. 6 above. The weather parameters or model parameters 228 are stored, representing which model parameters the models will execute over. The statistical error metric 128 represents the user selected error determination method to help in establishing the best mesoscale model. Finally, the physics packages selection 230 represents the physics packages selected per mesoscale weather model and the grid resolution 232 represents fine or coarse grained resolution selected by the user.

Figure 8:
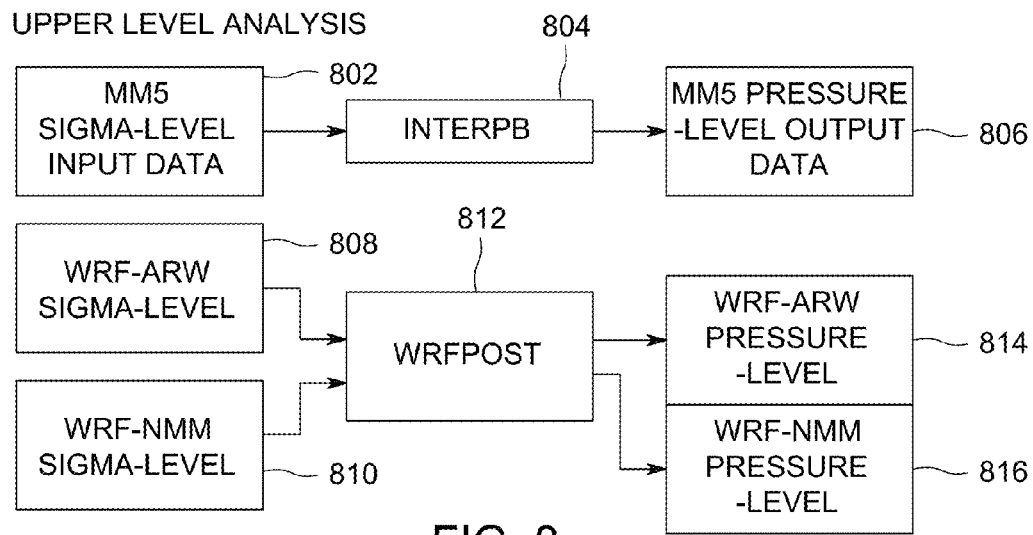
FIG. 8 depicts a functional block diagram showing the operation for converting sigma level analyses of executed mesoscale models to pressure level analyses of executed mesoscale models according to an exemplary embodiment of the present invention.

FIG. 8 is a functional block diagram showing the operation for converting sigma-level analyses of executed mesoscale models to pressure-level analyses of executed mesoscale models according to an exemplary embodiment of the present invention. MM5 model output is on "sigma" levels. The coordinate system for MM5 is (x, y, sigma). The x and y are a regular lattice of equally spaced points (delta-x=delta-y=horizontal grid spacing in kilometers) forming rows and columns. Sigma is a terrain-following vertical coordinate that is a function of the pressure at the point on the grid (in hydrostatic runs) or the reference state pressure (in non-hydrostatic runs), the surface pressure at the grid point, and the pressure at the top of the model. Sigma varies from 1 at the surface to 0 at the top of the model. The influence of the terrain on the sigma structure diminishes with height, so that the sigma surfaces near the top of the model are nearly parallel. Lacking MM5 data at pressure surfaces, a transformation of MM5 output must be carried out before it can be compared to radiosonde observation (RAOB) data. For example, there is MM5 sigma level output data 802 based on execution of the MM5 model interpolation for backend postprocessing (INTERPB) 804 which is an application provided with the MM5 model to enable transformation from model sigma levels to pressure levels. INTERPB 804 performs the following: 1) computes pressure values, 2) computes relative humidity and height values for the pressure surfaces, 3) computes 2-d values of surface pressure, sea-level pressure, latitude, and longitude and finally, 4) interpolates to pressure levels. The INTERPB module 804 produces MM5 pressure output data 806, which is then comparable with RAOB data reports.

Both WRF-ARW and WRF-NMM also produce output on native sigma levels that must be converted to pressure levels for comparison to RAOB truth data. WRF Post Processor 812, developed by the National Center for Environmental Prediction (NCEP) performs vertical interpolations onto pressure levels and allows for the WRF-ARM sigma-level output data 808 and WRF-NMM sigma-level output data 810 to be processed and transformed into WRF-ARW pressure-level data 814 and WRF-NMM pressure-level data 816.

Figure 9:
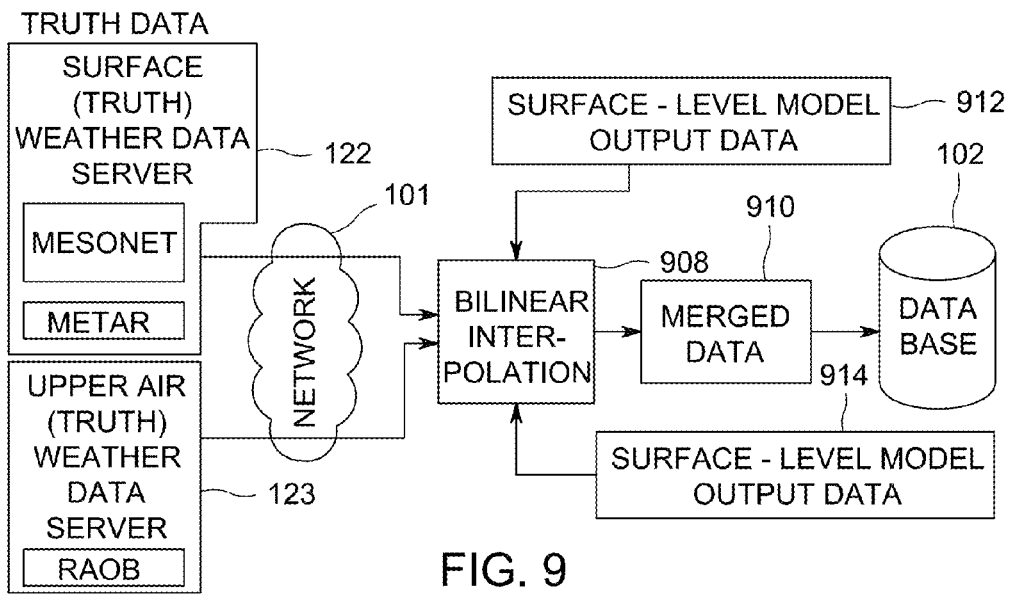
FIG. 9 depicts a functional block diagram representing storing truth data into the database of the apparatus in FIG. 1.

FIG. 9 is a functional block diagram representing storing truth data into the database 102 of the apparatus 100. The apparatus 100 requests (surface) mesonet and METAR data from Meteorological Assimilation Data Ingest System (MADIS) data source 122 and (upper-air) RAOB data from University of Wyoming data source 123 through network 101. A script 908 for bilinear interpolation maps and merges this data along with Surface-Level model output data 912 and pressure-level model output data 914 into merged data 910. The merged data 910 is then stored in the database 102. According to an exemplary embodiment, the data from data sources 902 and 904 comprises sets of hourly surface reports spanning a 24-h period and the current RAOB reports for the most recent 0000 UT and 1200 UT times. RAOB data is atmospheric balloon sounding data used to evaluate models at upper levels. The bilinear interpolation defines the following variables:

X=longitude of the observation
Y=latitude of the observation
X1=longitude of the left hand side of model grid box
X2=longitude of the right hand side of model grid box
Y1=latitude of the bottom of the model grid box
Y2=latitude of the top of the model grid box
Z1=observation value at lower left hand corner of model grid box
Z2=observation value at lower right hand corner of model grid box
Z3=observation at top left hand corner of model grid box
Z4=observation value at top right hand corner of model grid box
Z_B=the interpolated value returned to the main program.

The main portion of the subroutine function is as follows:

```
SUBROUTINE   BILINEAR_INTERP(Z,Y,X1,Y1,X2,Y2,Z1,Z2,
             Z3,Z4,Z_B)
INTEGER ZD,ZDD
   ZD=Z1+((Z2−Z1)/(X2−X1))*(X−X1)
   ZDD=Z3+((Z4−Z3)/(X2−X1))*(X−X1)
   Z_B=ZD+(ZDD−ZD)/(Y2−Y1)*(Y−Y1)
END
```

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

As used herein, the data sets which serve as "truth" for the statistical generation:

(1) the surface "truth" data set is composed of "mesonet" and "METAR" reports pulled from the "Meteorological Assimilation Data Ingest System" (MADIS) FTP site at 2100 MST daily. Datasets for hours 0000-2300 MST are gathered.

(a) these data sets are in netCDF format with each hourly block of data composed of many parameters (b) the first step in processing consists of using the 'ncdump' function to break out an hourly block of data
into files each representing a particular parameter at a particular hour
(c) then:
looping over the hours (00-23){
looping over the types (mesonet, metar){
looping over the parameters (wd, ws, t2, dewpoint, rh, lat, lon, rh, terrain){
call C code which reads off the "data" portion of the ncdumped file into a new file FIG. 10 illustrates a schematic overview of a preferred embodiment program menu showing menu tabs 1-3. The menu comprises 9 tabs, although a lesser or greater number could be utilized without deviating from the scope of the present invention. Menu Tab 1 (303) is referred to as "model domain," by which a region such as North America may be selected. Menu Tab 2 (306A) is referred to as "metric and optimization," and includes select a metric 306B, select a parameter 306C, and select a grid 307D. Menu Tab 3 (307) is referred to as "setup for new runs," which comprises the following subsections;

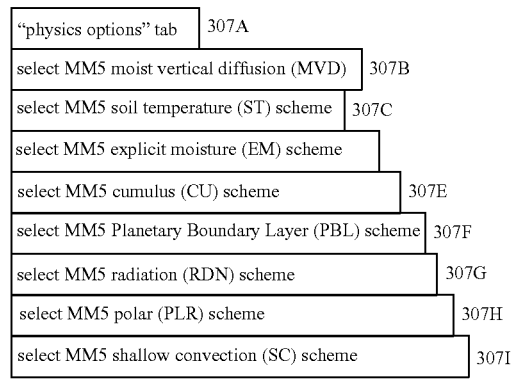

FIG. 11 illustrates a schematic overview of a preferred embodiment program menu showing menu tabs 4-6(part1). Menu Tab 4 (310A) is referred to as "Data Transfer." Data pulled via FTP and other means, including Global Forecast System (GFS), North American Model (NAM), and Naval Operational Global Atmospheric Prediction System (NOGAPS), is transferred to a "working" directory. Menu Tab 5 (310A) is referred to as "Model Execution." Menu Tab 6 (314A) is referred to as "Generate Statistics/Graphics." A detailed flow chart of this program section is depicted in FIGS. 15-21.

FIG. 12 illustrates a schematic overview of a preferred embodiment program menu showing menu tabs 6 (part 2) and 7. Menu Tab 7 (314A) is referred to as "Determine Best Model." A detailed flow chart of this program section is depicted in FIGS. 21-25.

FIG. 13 illustrates a schematic overview of a preferred embodiment program menu showing menu tab 8 (Graphics-319) and tab 9 (Overview 320).

FIG. 14 is a schematic depiction of the program section "Determine Best Model" depicting both surface and upper-air inputs.

FIGS. 15-21 depict parts 1-7 of a flow chart for program section "Generate Statistics/Graphics."

FIGS. 22-25 depicts parts 1-4 of a flow chart for program section "Determine Best Model."

The terminology "processor" as used herein may be a microprocessor, computer, multiprocessor, personal computer, CPU, coprocessor, central processor, or the like.

As used herein the terminology "parameters" refers to numerical or other measurable factors that define a measured system or sets the operating conditions for the system For example, user selected options may comprise temperature (T), relative humidity (RH), the u-component of the wind, the v-component, winds overall (the average of u-, v-component) or all the parameters (the average of T, RH, u-, and v-components) used for calibrating and compiling the mesoscale model.

As used herein, the terminology "truth data" means the "actual data" or "actual resultant data" or "actual result data" collected by sensors on a specific date and time for a particular weather parameter for use in determining which model has most accurately predicted the weather parameter. For example, "truth data" may comprise measured temperature (T), relative humidity (RH), the u-component of the wind, the v-component, winds overall (the average of u-, v-component) or all the parameters (the average of T, RH, u-, and v-components) that are used for determining the accuracy of predicted measurements.

As used herein the terminology "physics package" comprises all the components or set of parameters or parameterizations that model and/or characterize some physical aspect of the atmosphere, including, but not limited to radiation (shortwave and long-wave), the planetary boundary conditions, soil moisture and temperature, cloud dynamics, and the like. As used herein, the term "package" comprises a collection of physical rules relating to how the atmosphere functions with regards to radiation, soil moisture, etc.

As used herein the terminology "mesoscale area," as used in meteorology, refers to the scale of phenomena that range in size from 1-100 km (0.7-67 mi), intermediate between small (single storm clouds) and synoptic scales.

As used herein, the "synoptic scale" in meteorology (also known as large scale or cyclonic scale) is a horizontal length scale of the order of 1000 kilometers (about 620 miles) or more, and corresponds a horizontal scale typical of mid-latitude depressions or high and low-pressure areas seen on weather maps, As used herein, the terminology "Mesoscale model" refers to weather models used to predict weather parameters in a mesoscale weather system.

As used herein, the terminology "Upper Air level" or "upper air" or "upper air atmosphere" refers to the atmospheric level of the mesoscale area. For example, weather in the upper air levels of the atmosphere may be detected using balloons launched periodically to give detailed information about such items as the winds, temperature, pressure, and humidity in the upper level atmosphere, which is plotted on upper level maps, or upper air charts.

As used herein, the terminology "Initialization data" refers to the initial data comprising background data from which a model can be initially developed.

As used herein, the terminology "MM5," which is short for Fifth-Generation Penn State/NCAR Mesoscale Model refers to a regional mesoscale model used for creating weather forecasts and climate projections; a community model maintained by Penn State University and the National Center for Atmospheric Research (NCAR) with the last major release occurring in December 2004. The Weather Research and Forecasting model (WRF) was designed as the successor to MM5 and includes all capabilities available within the MM5.

As used herein, the terminology "statistical error metric" refers to the metric upon which the accuracy of the model outputs is based. For example, the model outputs may be compared with with "truth" or actually measured data using, for example, the root mean square between two data points.

As used herein, the standard error is the standard deviation of the sampling distribution of a statistic The term "standard error" refers to an estimate of that standard deviation, derived from a particular sample used to compute the estimate. The standard error of the mean can refer to an estimate of the standard deviation, computed from the sample of data being analyzed at the time.

As used herein, the terminology "grid resolution" refers to the minimum distance between measured or computed values which can be distinguished by the measurement or analytical method being considered or used. In a coarse grained grid resolution, there are less data points per meter, and in fine-grained there are more data points per meter.

Various elements, devices, modules and circuits are described above in associated with their respective functions. These elements, devices, modules and circuits are considered means for performing their respective functions as described herein.

While the foregoing is directed to embodiments of the present invention, other and further embodiments of the invention may be devised without departing from the basic scope thereof, and the scope thereof is determined by the claims that follow.

The invention claimed is:

1. A computer implemented method operable on at least one processor for determining the accuracy of a plurality of mesoscale weather models comprising:
   inputting into at least one processor a plurality of preexisting mesoscale weather models used for creating weather forecasts over a mesoscale area;
   inputting initial weather data comprising surface level and upper air temperatures and wind conditions for use by a mesoscale weather model;
   using each of the plurality of mesoscale weather models, generating output data comprising forecasted temperatures, wind conditions, and predicted weather conditions;
   inputting actually measured naturally occurring surface level and the upper-air level weather conditions which occurred subsequent to weather conditions which were the same or similar to the initial weather conditions;
   converting sigma-level analysis of the mesoscale models to pressure level analysis of the mesoscale models;
   comparing the output data to actually measured data obtained when same or similar initial weather data were present and subsequent resulting temperatures, relative humidity, wind conditions and weather conditions were measured;
   generating an accuracy rating for each mesoscale weather model reflecting the deviation of temperature, relative humidity, wind conditions and weather conditions predicted by each of the mesoscale weather models as compared to the actually measured surface level and the upper-air level weather conditions.

2. The method of claim 1 further comprising the step of modifying or compiling each of the mesoscale weather models so that each is compatible and so that output data may be generated from the initial weather data, and further comprising selecting, based on an error rating for each of the plurality of mesoscale weather models, the most accurate mesoscale weather model based upon surface and upper air level weather conditions.

3. The method of claim 2 further comprising performing validations of the initial weather data for each mesoscale weather model to determine whether the initial weather data is compatible with each of the plurality of mesoscale weather models.

4. The method of claim 2 further comprising selecting a mesoscale area in a geographic region and wherein the step of inputting the initial weather data comprises selecting one or more weather parameters for optimization, physics packages for modeling an aspect of the atmosphere, a grid resolution, and a statistical error metric for comparing each of the plurality of mesoscale models with each other and wherein the weather parameters selected to optimize over the model, including, but not limited to, temperature, relative humidity, the u-component of the wind, the v-component, winds overall (the average of u-, v-component) or all the parameters (the average of temperature, relative humidity, u-, and v- components.

5. The method of claim 2 wherein the step of inputting initial weather data comprises inputting weather parameters comprising surface and upper air level temperatures, relative humidity, the "u" and "v" components of the wind, shortwave radiation measurements, long-wave radiation measurements, planetary boundary layer conditions, soil moisture and temperature, and cloud conditions.

6. The method of claim 2 wherein the plurality of preexisting mesoscale models comprises Fifth Generation Mesoscale Model (MM5), Weather Research and Forecasting—Advanced Research Weather Research Forecasting (WRF-ARW), Weather Research and Forecasting—Nonhydrostatic Mesoscale Model (WRF-NMM) and Advanced Regional Prediction System (ARPS).

7. The method of claim 2 wherein the step of generating an accuracy rating comprises using a statistical error metric comprising one of mean absolute error, root mean square error and Newbold-Granger weighting coefficients and wherein the mean absolute error and the root mean square error are computed at grid points and the value at each grid point comprises interpolated initial and actual data.

8. The method of claim 7 wherein the method is performed by a web-based computer program and wherein the statistical error metric is calculated for execution of each of the plurality of mesoscale models at each grid point in the selected mesoscale area and each hour in a most recent twenty four hour period, and wherein the outputted data being compared to actual data is interpolated to the actual data point location in a bilinear manner for comparison, and wherein a first mesoscale weather model is selected based upon statistical comparison with surface level data and a second mesoscale weather model is selected based upon statistical comparison with upper-air level data.

9. The method of claim 2 further comprising generating graphical plots for the surface region and the upper air region comprising at least a bias plot and a scatter plot for each of the executed plurality of mesoscale weather models and wherein the step of generating an accuracy rating comprises comparing the tendency to over-estimate or under-estimate the selected weather parameters of each of the plurality of mesoscale weather models.

10. The method of claim 1 where the initial weather data is retrieved from one or more remote servers comprising Global Forecast System (GFS) data, North American Model (NAM) data, Navy Operational Global Atmospheric Prediction System (NOGAPS) data and wherein the actually measured data comprises retrieved Meteorological Assimilation Data Ingest System (MADIS) surface data and University of Wyoming radiosonde observation (RAOB) upper-air data retrieved from the remote servers and mapped to a local database.

11. A system for determining the accuracy of a plurality of mesoscale weather models comprising:
   at least one input for inputting a plurality of mesoscale weather models, user parameters, initialization data and actual result data;
   at least one memory for storage of mesoscale weather models, user parameters, initial data and actual result data;
   a user interface operatively connected to the at least one input configured to enable a user to determine the most accurate mesoscale weather model from a plurality of mesoscale weather models; the user interface operating to display a menu enabling the user to select an area of the world for determining the most accurate mesoscale weather model;
   at least one processor operatively connected to at least one memory, the at least one processor operating to select inputted user parameters and extract first data corresponding to the selected user parameters from the initialization data and actual result data, the at least one processor operating to modify and compile each of a plurality of mesoscale weather models according to the selected user parameters,
   the at least one processor configured to execute each of the plurality of mesoscale models based on the selected user parameters to generate output data in order to compare and rate each mesoscale model and wherein the comparing compares the tendency to over-estimate or under-estimate the selected weather parameters by each of the plurality of mesoscale weather models,
   the at least one processor operating to convert sigma-level analysis of the mesoscale models to pressure level analysis of the mesoscale models;
   the at least one processor operating to compare the output data to the actual result data and generate an accuracy rating for each of the plurality of mesoscale weather models for the most accurate surface level model and the most accurate upper-air level model and make a selection based on the accuracy of each of the plurality of mesoscale weather models.

12. The system of claim 11 further comprising a validation program component for validating the user parameters to determine whether the selected user parameters are compatible with the plurality of mesoscale weather models, and wherein selecting the user parameters comprises selecting:
   (a) a mesoscale area in a geographical region,
   (b) at least one weather parameters for optimization,
   (c) at least one physics packages for modeling an aspect of the atmosphere for each mesoscale model of the plurality of mesoscale models,
   (d) a grid resolution, and
   (e) a statistical error metric for comparing each of the plurality of mesoscale models with each other.

13. The system of claim 12 wherein the weather parameters comprise temperature, relative humidity and the "u" and "v" components of the wind; and wherein the plurality of mesoscale models comprises at least two of a Fifth Generation Mesoscale Model (MM5), Weather Research and Forecasting—Advanced Research Weather Research Forecasting (WRF-ARW), Weather Research and Forecasting—Nonhydrostatic Mesoscale Model (WRF-NMM) and Advanced Regional Prediction System (ARPS); and
   wherein the physics package is selected from shortwave radiation conditions, long-wave radiation conditions, planetary boundary layer conditions, soil moisture conditions, temperature, or cloud conditions, and wherein the user interface is operatively associated with a website comprising the menu and a content area, and wherein the user interface enables selection of weather parameters, statistics and graphical plots.

14. The system of claim 12 where the statistic error metric is one of mean absolute error, root mean square error or Newbold-Granger weighting coefficients.

15. The system of claim 14 wherein the statistical error metric is calculated for each of the plurality of mesoscale models at each grid point in the selected mesoscale area and each hour in a most recent twenty four hour period, and wherein model values surrounding actual result data points are interpolated to the actual result point location in a bilinear manner for direct comparison.

16. The system of claim 11 where the initialization data is retrieved from a plurality of remote servers that perform transmission control and internal protocol requests across a network to obtain initialization data from various sources through file transfer and the initialization data comprises Global Forecast System (GFS) data, North American Model (NAM) data, Navy Operational Global Atmospheric Prediction System (NOGAPS) data and the actual result comprises retrieved Meteorological Assimilation Data Ingest System (MADIS) surface data and University of Wyoming radiosonde observation (RAOB) upper-air data from the remote servers mapped to a local database.

17. The system of claim 11 further comprising generating graphical plots for each of the mesoscale weather models representing the comparisons, the graphical plots comprising at least a bias plot and a scatter plot.

18. The system of claim 17 wherein the generating of graphical plots further comprises generating plots for the surface region and the upper air region, and the comparing compares the tendency to over-estimate or under-estimate the selected weather parameters of each of the plurality of mesoscale weather models.

19. A system for determining the accuracy of a plurality of mesoscale weather models comprising:
   at least one processor;
   at least one memory configured to store instructions and data used by the at least one processor; the at least one memory comprising an error metric for evaluating the performance of the plurality of mesoscale weather models;
   at least one input for inputting into at least one processor a plurality of mesoscale weather models used for creating weather forecasts over a mesoscale area; and initial weather data comprising surface level and upper air temperatures and wind conditions for use by the plurality of mesoscale weather models; and actually measured naturally occurring surface level and the upper-air level weather conditions;
   the at least one processor operating to use the mesoscale weather models to generate output data comprising forecasted temperatures, wind conditions, relative humidity, and predicted weather conditions;

the at least one processor operating to convert sigma-level analysis of the mesoscale models to pressure level analysis of the mesoscale models;

the at least one processor operating to compare the output data to actually measured data obtained when same or similar initial weather data were present and subsequent resulting temperatures, wind conditions and weather conditions were measured;

the at least one processor operating to generate an accuracy rating based upon an error metric reflecting the deviation of temperature, wind conditions, relative humidity, and weather conditions predicted by the mesoscale weather models as compared to the actually measured surface level and the upper-air level weather conditions.

20. The system of claim 19 wherein the at least one processor operates to modify or compile each of the mesoscale weather models into executable computer programs so that each is compatible and so that output data may be generated from the initial weather data, and wherein the at least one processor operates to select, based on the error rating for each of the plurality of mesoscale weather models, the most accurate mesoscale weather model for each of the surface region and the upper-air region of the atmosphere based upon surface and upper air level weather conditions.

* * * * *